United States Patent [19]
Horiuchi et al.

[11] Patent Number: 5,737,239
[45] Date of Patent: Apr. 7, 1998

[54] SHAKING TEST METHOD AND SYSTEM FOR A STRUCTURE

[75] Inventors: Toshihiko Horiuchi, Ushiku; Hiroaki Kasai, Ibaraki-ken; Masaki Kurihara, Tsuchiura; Takao Konno, Ibaraki-ken, all of Japan

[73] Assignee: Hitachi, Ltd., Tokyo, Japan

[21] Appl. No.: 597,405

[22] Filed: Feb. 8, 1996

[30] Foreign Application Priority Data

Feb. 13, 1995 [JP] Japan .................... 7-023690

[51] Int. Cl.$^6$ .................................. G01H 11/00
[52] U.S. Cl. .................. 364/508; 364/506; 364/507; 364/512; 364/578; 73/662; 73/663; 73/778; 73/786
[58] Field of Search .................. 364/506, 508, 364/578, 512, 149–151, 160, 164, 165, 174, 177, 421, 553, 161; 73/662–665, 667–669, 772, 774, 778, 781, 786, 784, 804, 801, 805, 806, 602, 579, 582; 52/1, 167.1, 2.4, 1.6–1.8; 318/565; 340/683

[56] References Cited

U.S. PATENT DOCUMENTS

| | | | |
|---|---|---|---|
| 4,280,083 | 7/1981 | Hirai et al. | 318/565 |
| 5,060,519 | 10/1991 | Chojitani et al. | 73/662 |
| 5,327,358 | 7/1994 | Stubb | 364/508 |
| 5,388,056 | 2/1995 | Horiuchi et al. | 364/508 |
| 5,422,834 | 6/1995 | Horiuchi et al. | 364/578 |
| 5,576,971 | 11/1996 | Ishii et al. | 364/512 |

OTHER PUBLICATIONS

J.W. Leech, "Stability of a Finite–Difference Method for solving Matrix Equations", AIAA Journal, vol. 3, No. 11, 1965, pp. 2172–2173.

V.N. Shah, et al., "Modal Superposition Method for Computationally Economical Nonlinear Structural Analysis," Transactions of the ASME, vol. 101, May 1979, pp. 134–141.

R.W. Clough, "Dynamics Of Structures/Analysis Of Dynamic Response", McGraw–Hill Kogakusha, Ltd., 1982, pp. 191–206.

K. Takanashi et al., "Japanese Activities on On–Line Testing", Journal of Engineering Mechanics, vol. 113, No. 7, Jul. 1987, pp. 1014–1032.

M. Nakashima et al., "Development of Real–Time Pseudo Dynamic Testing", Earthquake Engineering And Structural Dynamics, vol. 21, 79–92 (1992) pp. 79–92.

Primary Examiner—James P. Trammell
Assistant Examiner—Hal P. Wachsman
Attorney, Agent, or Firm—Antonelli, Terry, Stout & Kraus, LLP

[57] ABSTRACT

A shaking test system for testing a structure including a shaking device for shaking the structure, measuring devices mounted on the shaking device for shaking the structure, external signal input device for inputting data indicative of external force for shaking the structure, as well as other calculating arrangements. The shaking test system permits the setting of a large time interval of a shaking test by converting natural modes of vibration expressed by a second-order differential equation, namely second-order lag system of a vibration differential equation into a first-order lag system or (0)th order lag system for short period mode.

21 Claims, 24 Drawing Sheets

F I G. 7
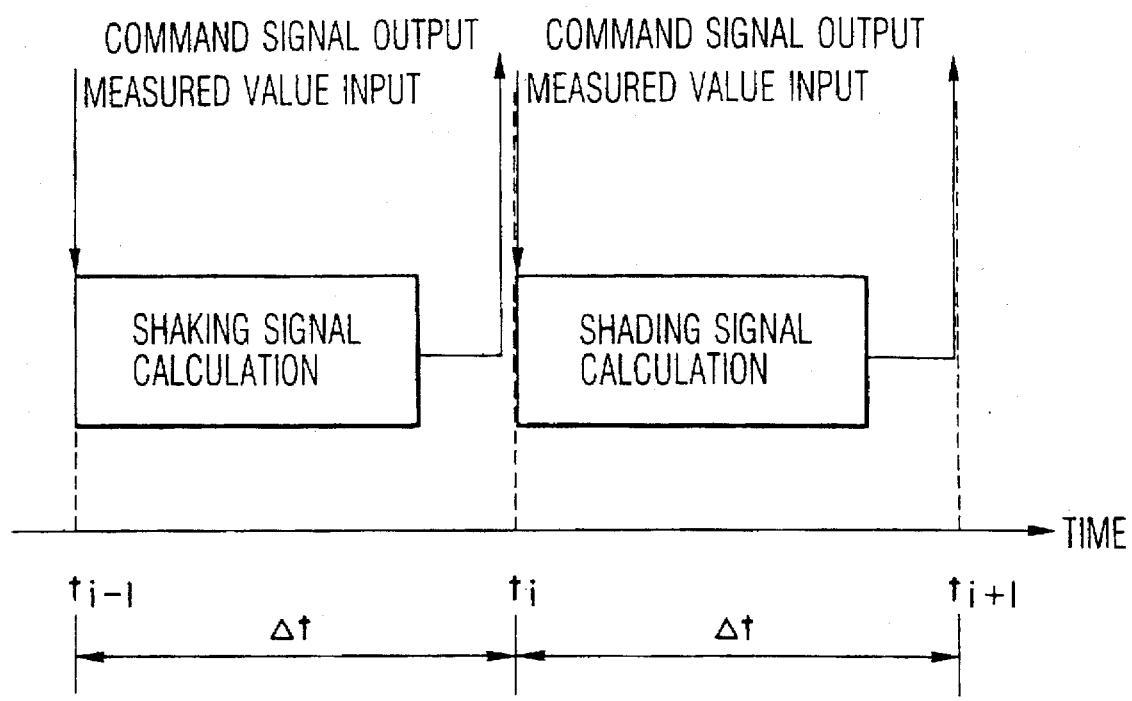

SHAKING TEST METHOD AND SYSTEM FOR A STRUCTURE

BACKGROUND OF THE INVENTION

The present invention relates to a method and a system for shaking test for a structure, in which a shaking test for a part of the structure and vibration response numerical analysis are performed in combination. More specifically, the invention relates to a shaking test system and method for a structure suitable for precisely implementing the shaking test, and to a shaking test system and method for a structure suitable in the case where the structure have a short natural period.

R. W. Clough, "Dynamics of Structures", McGraw-Hill Kagakusha, Ltd., 1982, pp. 575–578 recites a vibration analysis method utilizing a modal space.

V. N. Shah, et al., "Modal Superposition Method for Computationally Economical Nonlinear Structural Analysis", Transactions of the ASME, Journal of Pressure Vessel Technology, Vol. 101, May 1979, pp 134–141, discusses application of a vibration response analysis method utilizing a modal space to a non-linear system.

J. W. Leech, "Stability of a Finite-Difference Method for Solving Matrix Equation", AIAA Journal, Vol. 3, No. 11, 1985, pp. 2172 to 2173, recites upper bound for the time interval $\Delta t$ with respect to a natural period of an analysis objective structure in an vibration response numerical analysis by a central difference method.

K. Takanashi et al., "Japanese Activities on On-Line Testing", Journal of Engineering Mechanics, ASCE, Vol. 113, No. 7, July 1987, pp. 1014–1032 and M. Nakashima, et al., "Development of Real-Time Pseudo Dynamic Testing", Earthquake Engineering and Structural Dynamics, Vol. 21, 1992, pp. 79–92 recite real-time on-line testing.

For example, consideration is given for a structure as shown in FIG. 1. Amongst, a partial structure 2 is shaked by a shaking device 4 as shown in FIG. 2 and remaining portion is loaded in a computer 5 as a numerically modeled data. A load measuring device 6 is provided in the shaking device 4 to measure a reaction force to be exerted from the partial structure to the shaking device. The measured reaction force is input to the computer 5. The shaking device 4 is controlled by a control unit 7, and a command signal derived in the computer 5 is input to the control unit 7.

In the computer 5, a shaking force, such as an earthquake force to be exerted on the structure is sequentially input or stored in a memory (not shown) in the computer 7. The analyzing process is implemented by a step of calculating an external force vector from the shaking force and the measured reaction force, a step of calculating an vibration response of the numerical model after a given period, and a step of calculating a command value for the shaking device on the basis of the result of calculation of the earthquake response.

The calculation of the vibration response to be executed by the computer 5. A member 3 other than the partial structure 2 to be an object of test is established as a numerical model including a mass matrix M, a damping matrix C and a stiffness matrix K. Then, an equation of motion relating to a relative motion vector x may be expressed utilizing an external force q, as follows. It should be noted that the superscript "·" represents differentiation with respect to time.

$$M\ddot{x}+C\dot{x}+Kx=q \qquad (1)$$

Here, the external force q consists of a shaking force $q_1$, such as an earthquake force and a measured reaction force $q_2$. Therefore, $$q=q_1+q_2 \qquad (2)$$

Utilizing this, an vibration response after a small period $\Delta t$ is calculated. It should be noted that when shaking is achieved by inputting the result of calculation of the vibration response to the shaking device 7 and if only a static reaction force, such as a restoring force of the objective structure for testing is of interest, no problem will be arisen when shaking is achieved after a period longer than the period $\Delta t$ in calculation. Hereinafter, such testing method will be referred to as "pseudo-dynamic" test.

On the other hand, in order to measure a dynamic component, such as damping force and so forth contained in the reaction force $q_2$ and to reflect in the vibration response analysis, it is necessary to perform the shaking in real-time. Such testing method will be hereinafter referred to as "real-time" test.

A variety of algorithms may be employed as method of numerical calculation. In case of the central difference method, a displacement response at a timing $t_{i+1}$ ($t_{i+1}=t_i+\Delta t$) from a known information at a timing $t_i$ in the following equation:

$$x_{i+1} = \left(M+\frac{\Delta t}{2}C\right)^{-1}\left\{M(2x_i - x_{i-1}) - \frac{\Delta t}{2}Cx_{i-1} - \Delta t^2(Kx_i - q_i)\right\} \qquad (3)$$

wherein suffix i represents that the value is obtained at a timing $t_i$.

In the equation (3), the vector $x_{i+1}$ is obtained by matrix calculation. However, it is also possible to implement this in a modal space.

Japanese Unexamined Patent Publication (Kokai) No. Heisei 2-82132 and Japanese Unexamined Patent Publication No. Heisei 5-332876 disclose technologies for performing shaking test by implementing the numerical analysis in the modal space. On the other hand, in Japanese Unexamined Patent Publication No. Heisei 5-10846 or U.S. Pat. No. 5,388,056, there is a disclosure for a technology to match time axes in calculation and test for performing experiments in consideration of dynamic characteristics of the objective structure for testing, namely in real-time.

In the numerical calculation to be employed in the technologies set forth above, a range of parameter for stable calculation is determined depending upon the shortest natural period $T_{min}$ of the structure to be the object of the test and the calculation interval $\Delta t$. For example, in the central difference method, in order to accomplish numerical analysis, it becomes necessary to satisfy the following relationship.

$$\Delta t < T_{min}/\pi \qquad (4)$$

Therefore, in the case where the natural period to be evaluated is quite short, it becomes necessary to make the calculation interval $\Delta t$ shorter adapting to a stability criterion depending upon the calculation method, e.g., the foregoing equation (4) in case of the central difference method.

Therefore, in case of the pseudo-dynamic test, a large number of steps are required for evaluation of the response to earthquake excitation in a given period. Therefore, when a required period for each step of calculating and shaking is held unchanged, a period to perform experiments becomes quite long. Also, since the variation magnitude in shaking displacement of the shaking device 7 in one step becomes smaller, precision in shaking becomes worse. On the other hand, upon implementing the real-time test, it becomes necessary to perform the process to calculate response after the calculation interval Δt. However, when Δt is quite short, it becomes impractical to perform the calculation in such a short period.

As one measure for such problems, there has been proposed a method to calculate a natural mode of the overall structure 1 assuming the stiffness value of the objective structure of testing, implementing numerical calculation within the modal space, and whereupon the natural modes having short natural periods are neglected. However, in this method, when the assumed spring constant is different from the actual spring constant, error may be caused in obtained vibration characteristics.

On the other hand, the shaking device 4 to be employed in the shaking test generally has dynamic characteristics containing a response delay. Namely, as shown in FIG. 3, the shaking device has a characteristic to achieve the shaking displacement with a slight delay with respect to the input signal. When the shaking device 4 having the characteristic set forth above is employed in the real-time test, a linear spring having a spring constant k is evaluated to have a characteristic shown in FIG. 4. Assuming the delay period is δt, it should have negative damping force $c_{eq}$.

$$C_{eq} = -K \cdot \delta t \qquad (5)$$

This can be a cause of an error. Particularly, when an absolute value of $C_{eq}$ is greater than own damping of the structure, the vibration response may diverge.

Furthermore, in the prior art, since shaking test by means of the shaking device is employed, only reaction forces relating to relative displacement of both ends of the objective structure for testing. However, in case of real-time test, since acceleration is large, it is possible that an inertia force associated with relative acceleration contained in the measured reaction force cannot be ignored. Such inertia force is different from the inertia force obtained by base excitation and can cause error in the test.

SUMMARY OF THE INVENTION

It is an object of the present invention to provide a shaking test system and method for a structure, suitable for easily and precisely implementing shaking test even when a numerical analysis model has a short natural period.

Another object of the present invention is to provide a shaking test system and method which facilitates implementation of a real-time test by avoiding divergence of vibration response due to short period natural modes and permitting to set a long time interval of vibration response calculation.

A shaking test system for testing a structure, in accordance with the present invention, comprises:

a shaking device (4) for shaking the structure;

measuring means (6, 8) mounted on the shaking device for shaking the structure;

external signal input means for inputting data indicative of external force for shaking the structure;

modal external force calculating means (171) for proving modal external force with respect to vibration mode on the basis external force data input from the external force signal input means and external force induced by the structure input from the measuring means;

first vibration response calculation means for calculating vibration response (FIG. 9) with respect to each mode relating to a first-order lag system expressed by a differential equation to output of the modal external force calculating means;

second vibration response calculating means for calculating vibration response (FIG. 9) with respect to each mode relating to a second-order-lag system expressed by a differential equation to the output of the modal external force calculating means;

shaking commanding means (18) for generating a shaking command signal on the basis of outputs of the first and second shaking response calculating means; and a controller (7) connected to the shaking command means for controlling shaking for the virbration device on the basis of the shaking commanding means.

Evaluation of vibration response of the structure having a short natural period by implementing the test with a relatively large calculation time interval with high precision can be achieved by performing the calculation in the test with assuming a spring constant of an object of the shaking test, implementing the eigen value analysis of the overall structure, implementing numerical calculation in the modal space, wherein a short-period natural mode is replaced with a fast-order lag system or a proportional system and others are calculated as second-order lag systems for performing vibration response calculation, and with employing a testing system which permits the foregoing test.

On the other hand, canceling of negative damping to be caused by shaking device response delay can be achieved by predicting vibration response of the second-order-lag at a timing advanced in the magnitude corresponding to the shaking device response delay, and by employing the system which permits the foregoing operation.

Implementing of prediction of the vibration response within a short period can be achieved by taking a summation of products of the response values derived in the past with a given time interval and coefficients depending upon number of the response value used in this calculation.

Implementing prediction with high precision can be achieved by measuring the displacement of said shaking device, and by correcting the time interval in said prediction for matching both with comparison of the measured displacement value and shaking device response calculated value.

Removing of error due to inertia force included in the measured reaction force value can be achieved by preliminarily evaluating mass of the objective structure for shaking test, deriving the generated inertial force by multiplying or calculated shaking acceleration and the evaluated mass, removing the inertia force from the measured reaction force to use in calculation of shaking response, and employing the system which can perform the foregoing operation. On the other hand, it can also be achieved by mounting the shaking device and the objective structure for shaking test on a shaking table to implement shaking test.

To facilitate shaking test can be achieved by comparing the natural frequency input to the computer with a preliminarily input judgement condition to discriminate whether to be handled as the second-order lag system or the first-order lag system to transfer to the vibration response calculation processing means.

Furthermore, implementing the shaking test easily can be achieved by measuring the spring constant of the objective structure of the shaking test with preparatory shaking with a small amplitude, and by implementing the eigen value analysis for the overall objective structure for vibration response evaluation, and implementing the process automatically, and by employing a system which can perform the processes.

By assuming the spring constant of the object for shaking test, implementing the eigen value analysis of the overall structure employing the assumed spring constant, in implementation of the numerical calculation in a modal space, replacing a short period natural mode into a first-order lag system or a proportional system, and others are calculated as second-order lag systems to implement testing, and by employing a testing system which can implement the foregoing test, divergence of the shaking response due to large time interval of calculation system can be avoided. Therefore, the calculation timing interval can be set at the period corresponding to the shortest natural period in the modes handled as the second-order lag systems. Also, deformation due to natural mode of short period is evaluated as response of the first-order lag system or the proportional system, error will become smaller even when the value employed for the eigen value analysis of the spring constant of the partial structure of the object of test and the actual value is different. Therefore, vibration response evaluation of the structure having short natural period, can be performed with a relatively long calculation time interval with achieving high precision.

By predicting shaking response of the timing advanced in a magnitude corresponding to the shaking device response delay of the second-order lag system to use in generation of the shaking device command signal, and employing the system which can implement the foregoing process, the command signal of the predicted period advanced is achieved with a delay by the shaking device, the displacement to be achieved can be achieved at the timing to achieved the displacement. This permits to cancel the negative damping to be caused due to response delay of the shaking device.

By taking the summation of the products of the response values calculated at the given time interval in the past and the coefficients depending upon the number of the response values used in this calculation to derive the predicted value, and employing the system which can perform the foregoing process, prediction can be performed with simple multiplying and summing operations in a short period.

By measuring displacement of the shaking device and correcting the time interval so as to match the measured displacement, prediction may follow variation of the dynamic characteristic to perform diction with high precision.

By evaluating the mass of the objective structure for shaking test preliminarily, deriving the inertia force generated by measurement of the acceleration, removing the inertia force from the reaction to use in shaking response, and by employing the system which can perform the operation, the shaking response calculation is performed with employing only load relating to relative deformations between both ends of the objective structure for the shaking test to permit removal of the inertial force included in the reaction force.

On the other hand, by mounting the shaking device and the objective structure for the shaking test on the shaking table to perform the shaking test, the inertia force generated by base excitation can be correctly included in the measured reaction force, and can remove the error due to inertia force contained in the reaction force.

By providing a function for the computer to compare the natural period input to the computer or its associated value (e.g., natural frequency) with a preliminarily input criterion to make judgement whether to handle as a second-order lag system or a first-order lag system to transfer to the vibration response calculation processing means, the tester is not required to make judge for which natural mode is to be handled as a first-order lag system to facilitate implementation of the shaking test.

Furthermore, implementing the shaking test easily can be achieved by measuring the spring constant of the objective structure of the shaking test with preparatory shaking with a small amplitude, and by implementing the eigen value analysis for the overall objective structure for vibration response evaluation, and implementing the process automatically, and by employing a system which can perform the processes, and the system which can implement the foregoing process may be employed. Thus it becomes unnecessary to perform evaluation of the spring constant of the partial structure for shaking test and to perform the eigen value analysis, to facilitate shaking test with high precision.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings:

FIG. 7 is a time table for implementing the shaking test;

DESCRIPTION OF THE PREFERRED EMBODIMENTS

Figure 1:
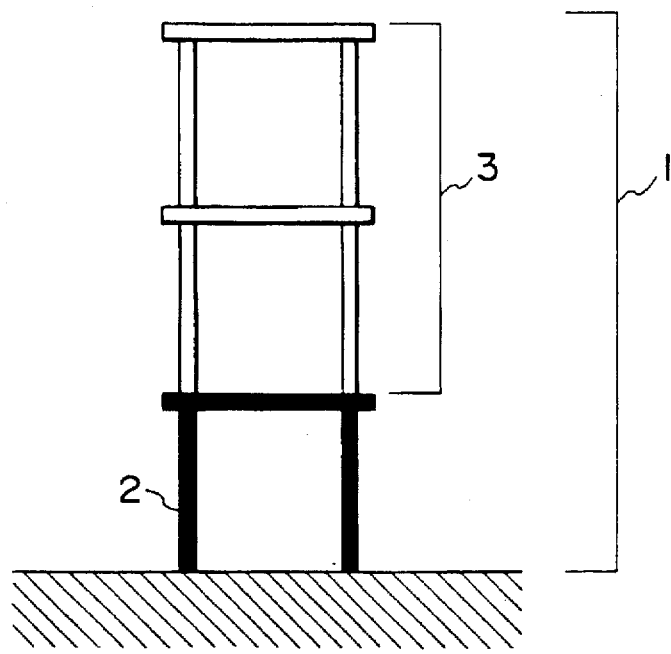
FIG. 1 is a diagrammatic illustration showing one example of an objective structure for vibration response evaluation.
Figure 2:
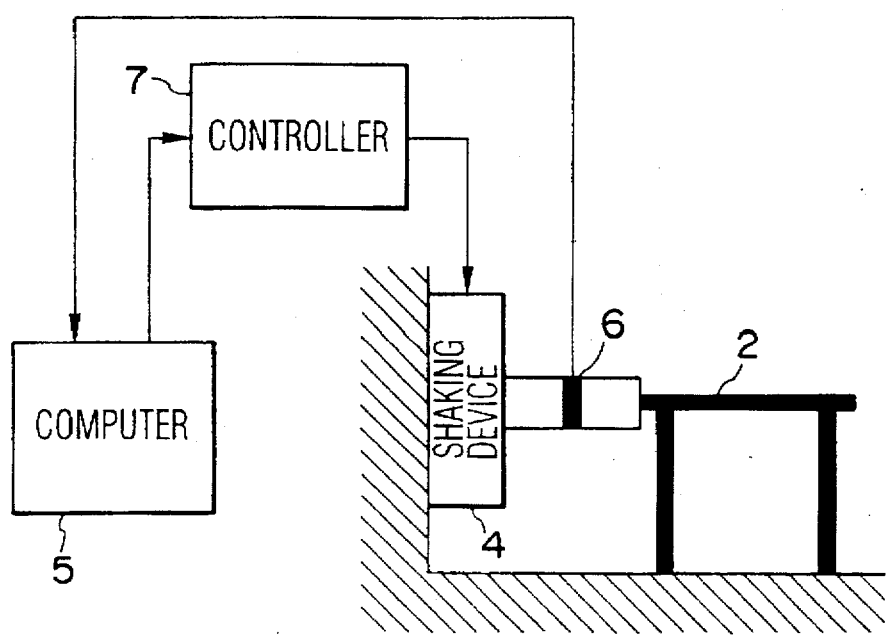
FIG. 2 is a diagrammatic illustration of the conventional shaking test method.
Figure 3:
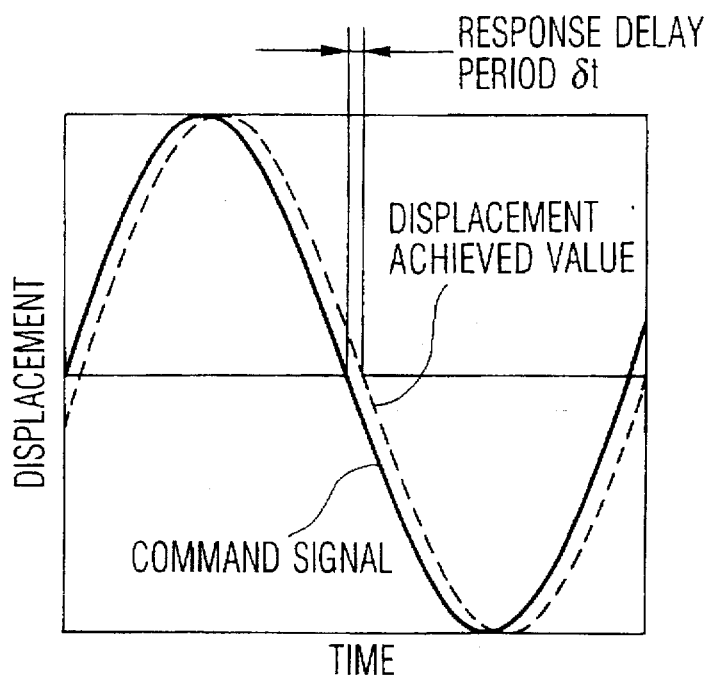
FIG. 3 is a characteristic chart showing a dynamic characteristic of a shaking device.
Figure 4:
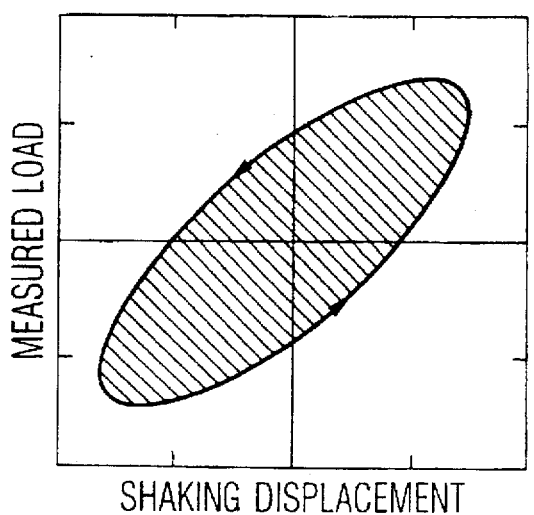
FIG. 4 is a characteristic chart of negative damping to be caused due to delay of the shaking device in a real-time test.

The present invention will be discussed hereinafter in detail in terms of the preferred embodiments of the invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

At first, outline of a shaking test method, in which earthquake response calculation is performed employing a modal space, will be discussed. For example, considering the structure 1 shown in FIG. 1 as an object for the shaking test, the partial structure 2 between a base and a lowermost mass is taken as an object for the shaking test, and other portions are taken as numerically modeled. As an external force, a base acceleration is considered. An equation of motion relating to the base excitation of the structure 1 including the partial structure 2 is expressed as:

$$M^*\ddot{x}^*+C^*\dot{x}^*+K^*x^*=-M^*\ddot{z}  \quad (6a)$$

From this, neglecting the damping term for simplification, the equation of motion (6a) can be modified as:

$$M^*\ddot{x}^*+K^*x^*=-M^*\ddot{z}  \quad (6b)$$

wherein $M^*$ is a mass matrix, $K^*$ is a stiffness matrix, $x^*$ is a relative displacement vector with respect to a base, $i$ is a vector all of the element is 1, $z$ is a base acceleration. It should be noted that these matrices and a vector include the partial structure as the object for the shaking test, and thus are different from those of the foregoing equation (1), and thus are distinguished by adding the symbol (*).

The actual stiffness of the partial structure and the stiffness of the numerical model can be different due to prediction error in numerical modeling, variation of element characteristics during shaking or so forth. Letting the actual and assumed spring content of the partial structure be k and k', respectively, and also letting supposed stiffness matrix as the numerical model be K', the stiffness matrix $K^*$ in the equation (6b) can be expressed as follow:

$$K^*=K'+(k-k')E  \quad (7)$$

Here, E is a unit element stiffness matrix of the partial structure. For example, in case of the member having support points as shown in FIG. 1

$$E = \begin{pmatrix} 1 & 0 & \cdots & & 0 \\ 0 & 0 & \cdots & & 0 \\ \cdot & \cdot & & & \cdot \\ \cdot & \cdot & & & \cdot \\ \cdot & \cdot & & & \cdot \\ 0 & 0 & \cdots & & 0 \end{pmatrix}  \quad (8)$$

Substituting the equation (7) into the equation (6b), the following equation can be obtained:

$$M^*\ddot{x}^*+K'x^*=-M^*\ddot{z}-f  \quad (9b)$$

The first term of the right-hand side representing the external force, such as earthquake force applied by base excitation, and the second term of the right-hand side is a pseudo external force induced by the structure and is expressed by:

$$f=(k-k')Ex  \quad (10)$$

Accordingly, it should be appreciated that implementing numerical calculation of the vibration response by adding the load f as expressed by the foregoing equation (10) as external force to the equation of motion employing the supposed stiffness matrix K' as expressed by the foregoing equation (9), would be equivalent to calculation of the equation (6b).

On the other hand, the foregoing equation (10) may be re-written as:

$$f=(k\Delta x-k'\Delta x)\gamma=(q'-k'\Delta x)\gamma  \quad (11)$$

Here, $\Delta x$ is a relative displacement between both ends of the partial structure 2, which is a shaking displacement by the shaking device 4, and $\gamma$ is a vector of which elements corresponding to nodal points where a load of internal force of the partial structure acts, are 1 or −1, and the elements for other nodal points are 0.

Figure 5:
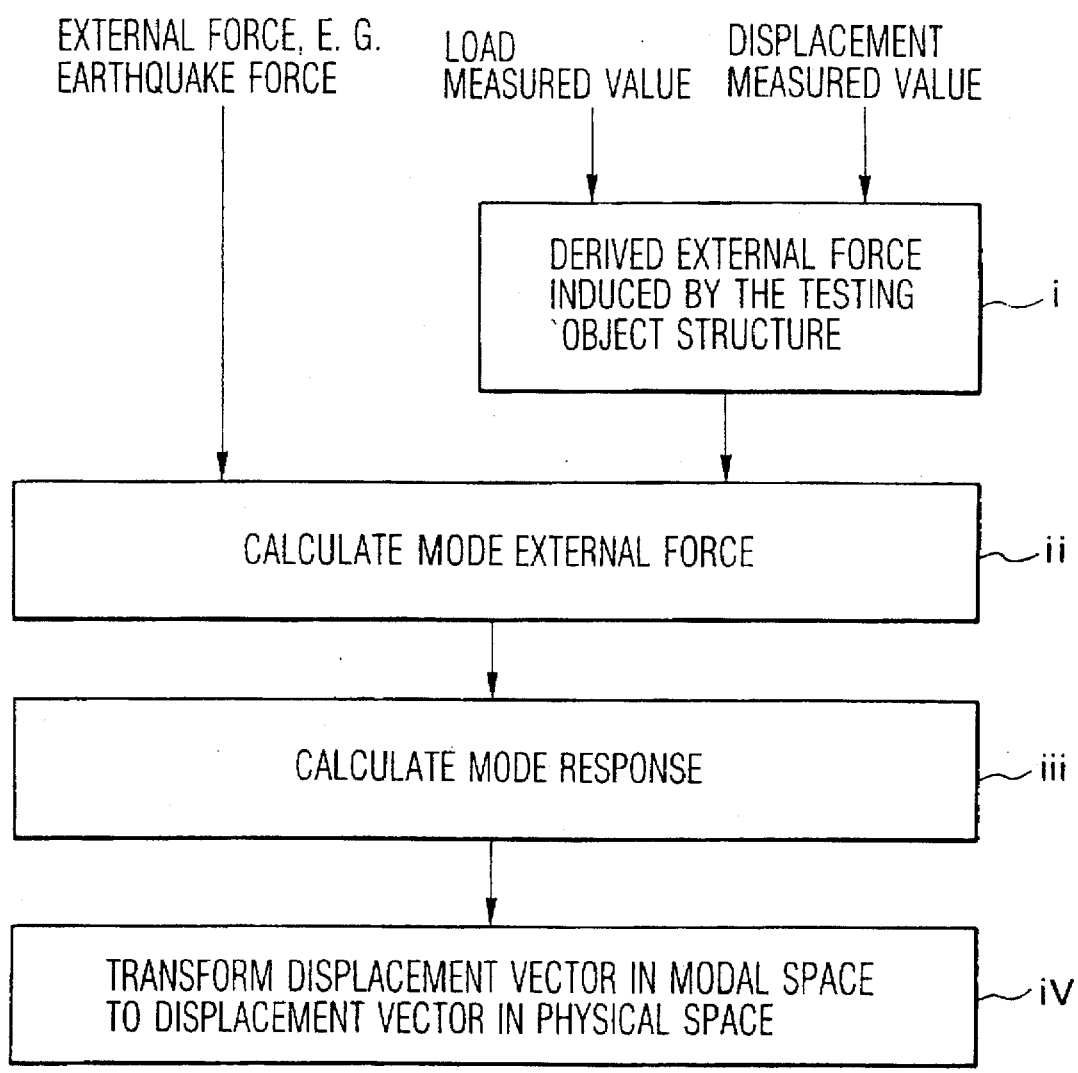
FIG. 5 is a flow diagram of the shaking test employing a mode space.

$k\Delta x$ is a reaction force actually generated in the partial structure and can be measured, $k'\Delta x$ is an amount which can be derived by measuring displacement of the shaking device. Accordingly, as shown in FIG. 5, it is possible to implement the shaking test employing the foregoing equation (9). It should be noted that when a damping characteristics or non-lineality is present in the partial structure, these characteristics may be reflected on the measured reaction force and thus are considered in numerical calculation of the vibration response.

Assuming that the right-hand side of the foregoing equation (9) is 0, eigen value analysis is performed to convert into the modal space employing natural mode vector. In the eigenvalue analysis, the following equation may be established with taking number of freedom as n.

$$x^*=Pu=[p_1, \ldots, p_b \ldots, p_n]u  \quad (12)$$

Here, u is a modal displacement vector, P is a mode matrix, $x^*$ is the displacement vector in the physical space, $p_i$ is the mode vector of (i)th order. It should be noted that, in the following discussion, the natural mode is assumed to be normalized to have the modal mass to be 1 for simplicity. Namely, with taking I as a unit matrix, $$P^TMP=I  \quad (13)$$

wherein suffix T represents transpose.

Even with the foregoing, generality will never be lost. Using this, the foregoing equation (9) can be re-written as follow:

$$\ddot{u} + \begin{bmatrix} \omega_1^2 & 0 & \cdots & & 0 \\ 0 & \cdot & & & \cdot \\ \cdot & \cdot & \cdot & & \cdot \\ \cdot & & \cdot & \cdot & \cdot \\ \cdot & & & \cdot & \omega_2 \\ 0 & \cdots & & 0 & \omega_n \end{bmatrix} u = w \quad (14a)$$

wherein, $$w = -bz - g(q' - k'\Delta x) \quad (14b)$$

Here, $\omega_i$ is the natural circular frequency of the (i)th mode and is expressed as:

$$\omega_i^2 = p_i^T K p_i$$

b is a participation factor vector and g is a participation factor vector with respect to the shaking force to be generated from the partial structure, which participation factor vectors are given by the user as input data.

$$b = p_i^T M i \quad (16)$$

$$g = P^T \gamma \quad (17)$$

Concerning (i)th order mode, by adding the damping item which has been neglected in the foregoing equation (6b) to the formula (14a), the following equation (14c) is obtained.

$$\ddot{u}_i + 2\xi_i \omega_i \dot{u}_i + \omega_i^2 \cdot u_i = w_i \quad (14c)$$

wherein the suffix i indicates that the value is that of the (i)th mode, $\xi$ is a modal damping ratio.

Here, $\ddot{u}$ is an inertia term, and the right-hand side is a modal external force representative of magnitude of the external force with respect to one of the modes in the modal space.

It should be noted that the mode parameters obtained from the stiffness matrix of the assumed numerical model. Therefore, it is not required to be always true.

The foregoing process may be summarized as shown in FIG. 5 in a form of flow diagram. Namely, on the basis of a load measured value and a displacement measured value, calculate the external force due to the structure to be objective structure for the test (step i). Next, from the derived output and the external force, such as the earthquake force and so forth, calculate a modal external force corresponding to the right-hand side of the foregoing equation (14c) (step ii). Next, a modal response is derived (step iii), and from this, conversion into the physical space (step iV). By this, even when the vibration calculation is performed with the modal space, the equivalent result in the shaking test to that to be attained by employing the equation (3) can be obtained. Upon performing vibration numerical calculation by the equation (14c), a natural mode with a short period can be removed. However, when the mode is removed, it has been appreciated that a difference between the supposed spring constant k' in the eigen value analysis and the actual spring coefficient k can be a cause of error.

Figure 6:
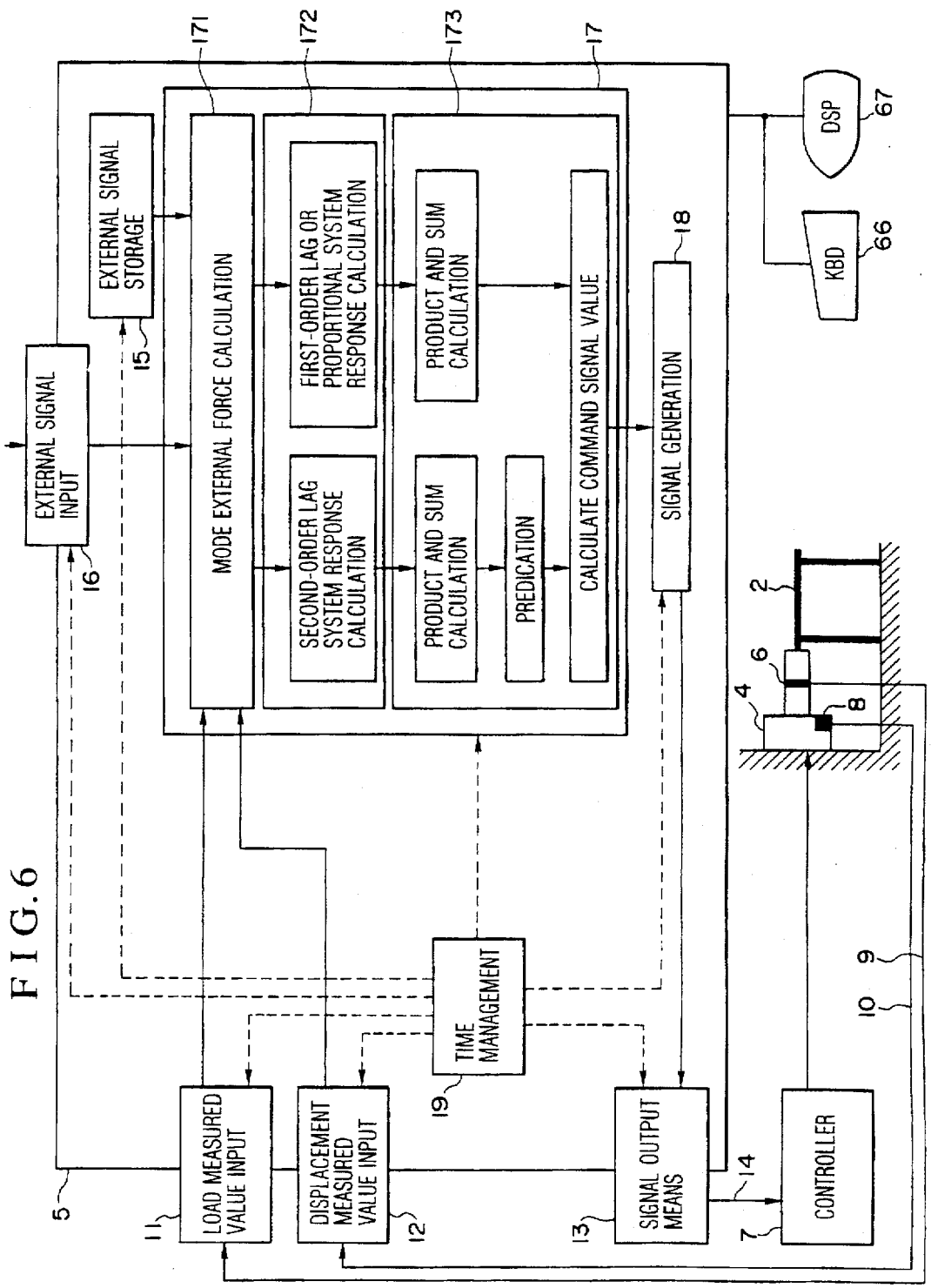
FIG. 6 is a block diagram showing one embodiment of a shaking test system according to the present invention.

Hereinafter, one embodiment of the present invention will be discussed with reference to FIG. 6. The partial structure 2 is shaken by the shaking device 4. In the shaking device 4, measuring means 6 for measuring a load applied to the partial structure 2 from the shaking device 4 and measuring means 8 for measuring displacement caused on the partial structure 2 by the shaking device 4. The measured value of the load measuring means 6 is transmitted to a load transmission means 9 and input to the computer 5 which is a digital computer, via a load input means 11.

On the other hand, the measured value of the displacement measuring means is transmitted to a displacement transmission means and input to the computer 5 via a displacement input means 12 in the similar manner. In the computer, one or both of an external force signal value storage means 15 and an external force input means 16 are provided. Thus, the external force, such as earthquake force and so forth applied to the objective structure 1 for vibration response evaluation is stored or input.

In the computer 5, a shaking device command signal calculating means 17 is loaded. The shaking device command signal calculating means 17 derives a command signal to the shaking device with the load measured value, the displacement measured value and the external force value. On the other hand, a command signal generating means 18 is loaded in the computer 5. The command signal generating means generates a command signal on the basis of the result of calculation of the command signal and outputs the signal via a command signal output means 13. The command signal is input to the control unit 7 of the shaking device 4 via a command signal transmission means 14 for driving the shaking device.

Inputting of the external force value, the load measured value and the displacement measured value, derivation of the shaking device command signal, generation of the shaking device command signal and outputting of the shaking device command signal are managed by a time managing means 19. For example, as shown in FIG. 7, respective operations are repeatedly performed per a given time interval.

It should be noted that the load and displacement measured values and shaking device command signal are transmitted as voltage signals, for example. At this time, the signal transmission means 9, 10 and 14 are cable lines. On the other hand, the signal input means 11 and 12 are A/D converters, the signal output means 13 is a D/A converter. However, these signals may be taken other forms and depending upon the signal forms to be used, the transmission means and input/output means may be implemented using suitable devices.

In the command signal deriving means 17, the signal is derived through the following procedure. It should be noted that the parameters (natural frequency, mode vector, participation factors and so forth) necessary for the following calculations are preliminarily input through data input means included in the computer 5 and stored in a data storage means (not shown) in the following manner for availability for use.

(1) In the input calculating means 171, a load to be applied to the objective structure for evaluation is calculated. Namely, a difference of the load measured value q' and the product of displacement measured value $\Delta x$ and the spring constant k' supposed in the numerical model is calculated. A base excitation acceleration value which is the cause of external force, such as an earthquake is input to the input calculation means 171. Then, with the equation (14b). The external force term in each mode is calculated, the excitation force by an acceleration caused by base excitation to a certain mode is a product of an element of the participation factor b corresponding to the mode in equation and an acceleration value input in the preceding step. The shaking force relating to a load caused by the partial structure is a product of an element of the participation factor vector g in the mode in equation and a difference of the load measured value q' and the product of displacement measured value $\Delta x$ and the spring constant k' supposed in the numerical model (g·(q'−k'$\Delta x$)).

(2) In the response calculating means 172, the vibration response after $\Delta t$ is derived. At this time, after setting of the numerical model and in advance of shaking test in view of stability discussed later, it is possible to handle a mode to be simplified into a first-order differential equation, i.e. a first-order lag system, with neglecting second-order differential term of the foregoing equation (14c), or into a (0)th order differential equation with neglecting the second-order differential term of the first-order differential term may be selected. Other modes may be handled as a second-order lag systems and can be calculated by an algorithm of the equation (3) or so forth. On the other hand, modes which is considered to have little influence to the vibration response, may be neglected. For example, the mode of a short natural period of FIG. 8, which is originally a second-order lag system may be replaced by a proportional system (spring element) within a range of implementation of the test, whereas the mode of a long natural period of a second-order lag system is treated as the second-order differential equation. The calculation time interval $\Delta t$ is to be set to satisfy a relational expression, such as the equation (4) with respect to the shortest period among the modes to be treated as the second-order lag system.

(3) In the signal value calculating means 173, a command signal value of the shaking device (respective displacement $\Delta x$ at both ends of the partial structure 2 to be applied after $\Delta t$) is calculated. At first, concerning the modes, in which the vibration response is calculated in the second-order lag systems, for the mode vibration response, the products of a modal displacement and a difference of two elements corresponding to nodal points at both ends of the mode vector of the partial structure 2 are calculated and the grand total of the products is obtained. This is called as $\Delta x_t$ which is expressed by:

$$\Delta x_l = \sum_{j=1}^{n_1} (p_{kj} - p_{lj}) u_j \qquad (18)$$

wherein $n_1$ is number of modes to be considered as a second-order lag system;

$p_{kj}$ is an element correspond to the nodal point of the (j)th mode vector;

k and l: nodal point numbers of both ends of the partial structure 2; and $u_j$ is a vibration response of the (j)th mode.

Also for the modes calculated as the first-order lag system of first-order differential equation or as the proportional system of (0)th order differential equation, similar process is performed to derive $\Delta x_h$. Next, a value of $\Delta x_l$ at a timing advanced for a period corresponding to the delay period of the shaking device is predicted as $\Delta x_l'$. Then, a sum of $\Delta x_h$ and $\Delta x_l'$ is calculated as the shaking device command signal $\Delta x$ as expressed by the following equation (19).

$$\Delta x = \Delta x_l' + \Delta x_h \qquad (19)$$

Through the process set forth above, the command signal value is calculated.

Furthermore, in the command generating means 18, on the basis of the calculated value, the signal is generated depending upon the signal output means 13 and the shaking device 4. It should be noted that outputting of the signal is implemented according to a time table shown in FIG. 7 by the time managing means.

Figure 8:
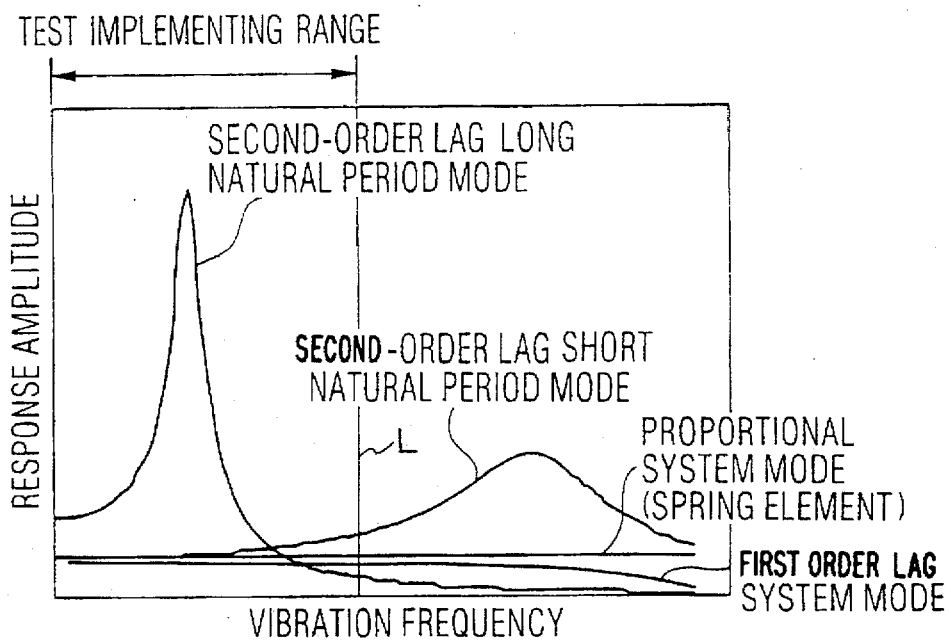
FIG. 8 is a diagrammatic illustration of a mode frequency response.

The reason of handling the short period modes as a first-order lag system or a proportional system as in the shown embodiment will be now discussed. FIG. 8 shows a diagram of frequency response of modes. In the testing supposing the earthquake force, a testing range is set at position L of the maximum vibration frequency and the lower vibration frequency side. The natural mode of a short period, i.e. a high frequency, has substantially constant amplitude in the range to implement the test, and can be considered as a simple spring system. Also, considering the energy to be scattered and lost in this element, it can be modeled as the first-order lag system.

If this mode is removed, the displacement to be caused in this mode is lost to cause reduction of displacement of the vibration point. Namely, this is equivalent to the greater spring constant than actual one, therefore becomes a cause of error, such as increasing of the natural frequency. When the short period mode is taken as proportional system or first order system, since stability is not affected by the time interval $\Delta t$, the time interval shorter than the minimum period in the mode handled as the second-order lag system may be set. Accordingly, by replacing the short natural period mode with a spring element, the time interval $\Delta t$ can be set corresponding to the mode of a long natural period to make the time interval $\Delta t$ longer in comparison with the case where the short period mode is handled as a second-order lag system, and thus the process shown in FIG. 7 can be easily realized. In more concrete, the operator designates the time interval for implementation of the shaking test via a terminal having a keyboard 66 and a display 67, and designates to convert the modes having natural period shorter (see FIG. 8) than the determined period, such as by the equation (4), into the first-order lag system or the proportional system.

Figure 9:
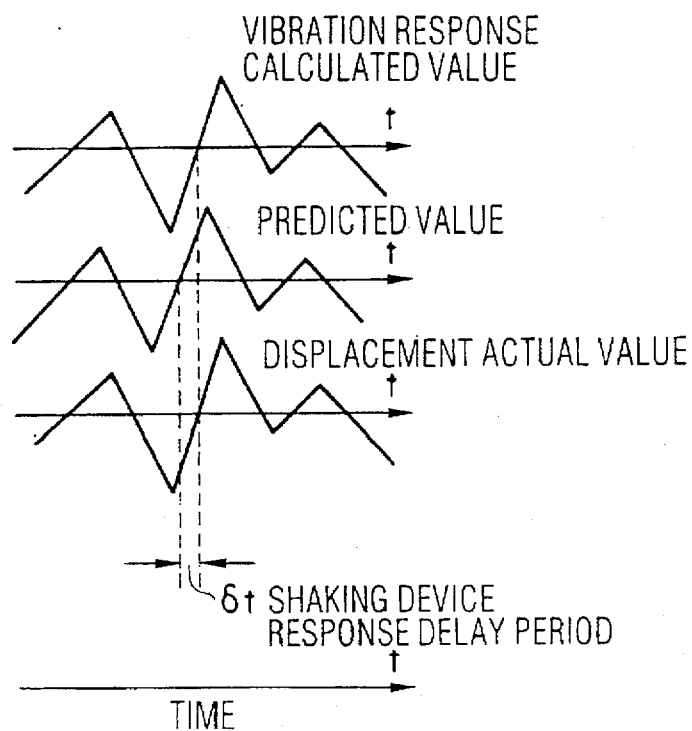
FIG. 9 is an explanatory illustration of an effect of a response delay prediction.

On the other hand, as in the shown embodiment, by producing the command signal for the shaking device with predicting the future response value of the modes treated as second-order lag system advanced for a period corresponding to the delay period of the shaking device, since the response of the shaking device is delayed for the predicting period as shown in FIG. 9, the response to be achieved can be achieved at a timing to be achieved.

The reason why no prediction is performed with respect to the mode handled as a first-order lag system or a proportional system, is as follows. A large error is expected with respect to the vibration having shorter period than the prediction period, in the response prediction, in general. As for a second-order lag system, since response ratio is abruptly lowered associating with increasing of the frequency in the vibration frequency range higher than the natural frequency, the response becomes substantially zero to be canceled. However, in the proportional system or the first-order lag system, even at the high vibration frequency side, the response ratio is not decreased and the error in prediction appears substantially as is to make error in vibration analysis. In the worse case, stable analysis may become impossible.

With the shown embodiment, since the time interval can be set larger to make it easier to realize the real-time test. Also, since the response delay of the shaking device can be corrected, stable and high precision vibration test can be performed.

Figure 10:
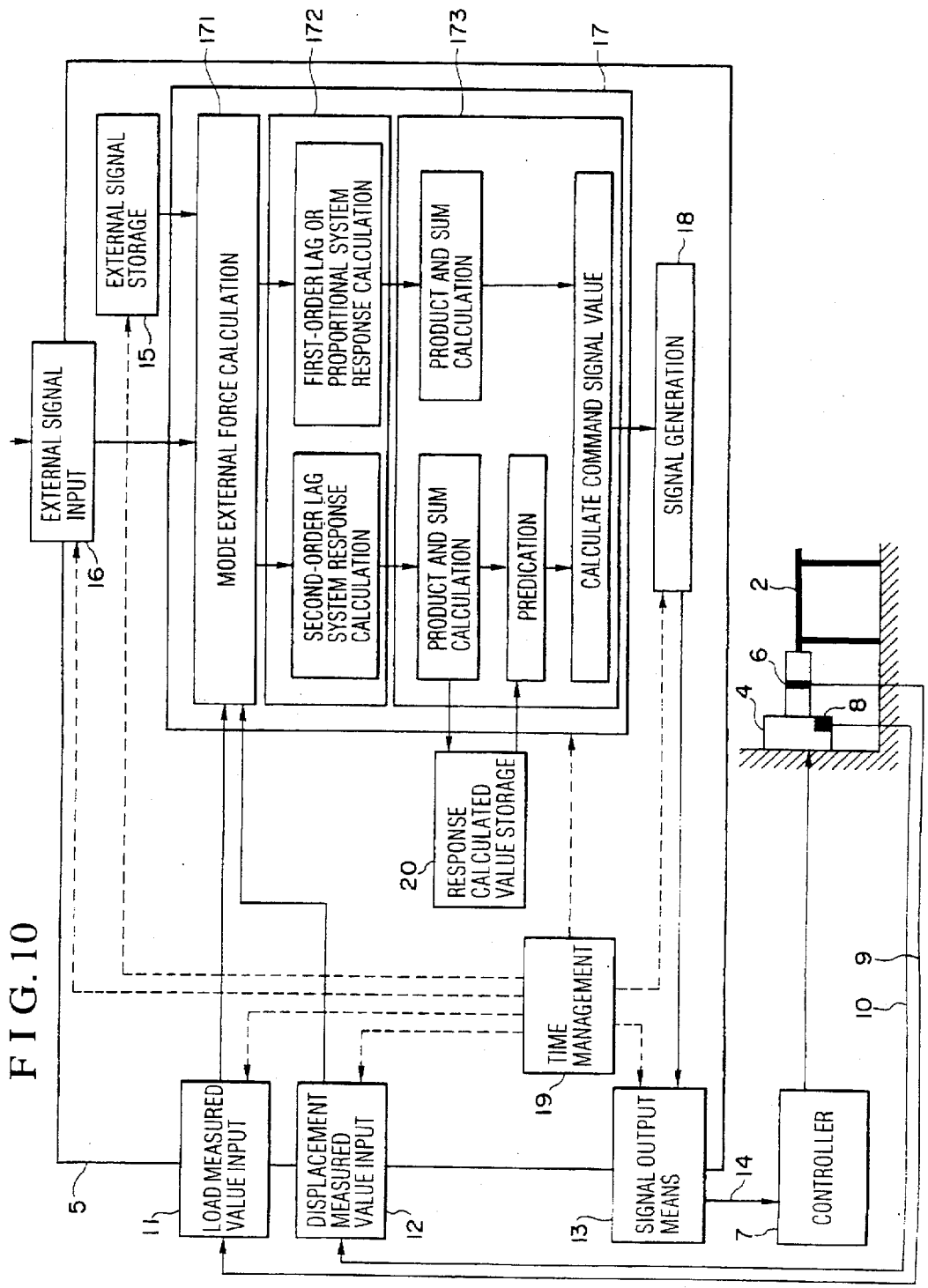
FIG. 10 is a block diagram showing another embodiment of the shaking test system according to the invention.
Figure 11:
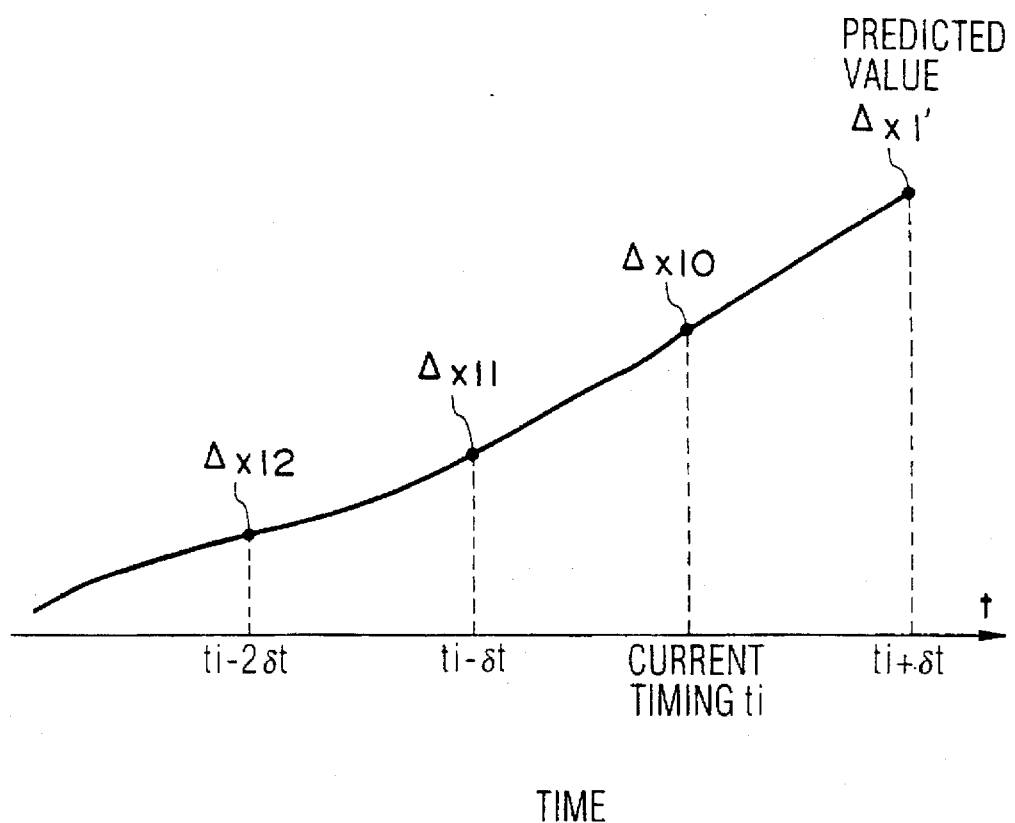
FIG. 11 is an explanatory illustration of an effect of a response delay prediction of the embodiment of FIG. 10.

Another embodiment will be discussed with reference to FIG. 10. In the embodiment of FIG. 10, in addition to the former embodiment, a response calculated value storage means 20 is added. As shown in FIG. 11, in the shown embodiment, the response $\Delta x_l'$ relating to the second-order lag systems, is calculated as a sum of the product of the response calculated value $\Delta x_{lk}$ at a preceding period corresponding to the shaking device response delay period δt from the current timing (k=0, 1, 2, ...). It should be noted that number of data to be used for prediction may be selected arbitrarily.

TABLE 1

COEFFICIENT TO BE USED IN PREDICTION

| Number of Data | a0 | a1 | a2 | a3 | a4 |
|---|---|---|---|---|---|
| 2 | 2 | −1 | 0 | 0 | 0 |
| 3 | 3 | −3 | 1 | 0 | 0 |
| 4 | 4 | −6 | 4 | −1 | 0 |
| 5 | 5 | −10 | 5 | −2 | 1 |

Namely as expressed by the following equation $$\Delta x_f = \sum_{k=0}^{m-1} a_k \Delta x_{lk} \qquad (20)$$

wherein m: number of data to be used for prediction;

$a_k$: value indicated in table 1

$\Delta x_{lk}$: value of $\Delta x_l$ before the current timing by (δt × k);

With the shown embodiment, since prediction of response can be implemented by simple multiplications and summations, calculation period can be shortened. Therefore, the process such as shown in FIG. 7 can be easier. It should be noted that since the response calculated value is calculated per every time interval δt, it is not always possible to obtain the value $\Delta x_{lk}$ per every shaking device response delay period δt. In such case, the response calculated value $\Delta x_{lk}$ at the closest timing to the δt interval is used, or, in the alternative, by interpolation of the response calculated value, $\Delta x_{lk}$ is calculated to perform calculation of the equation (20).

Figure 12:
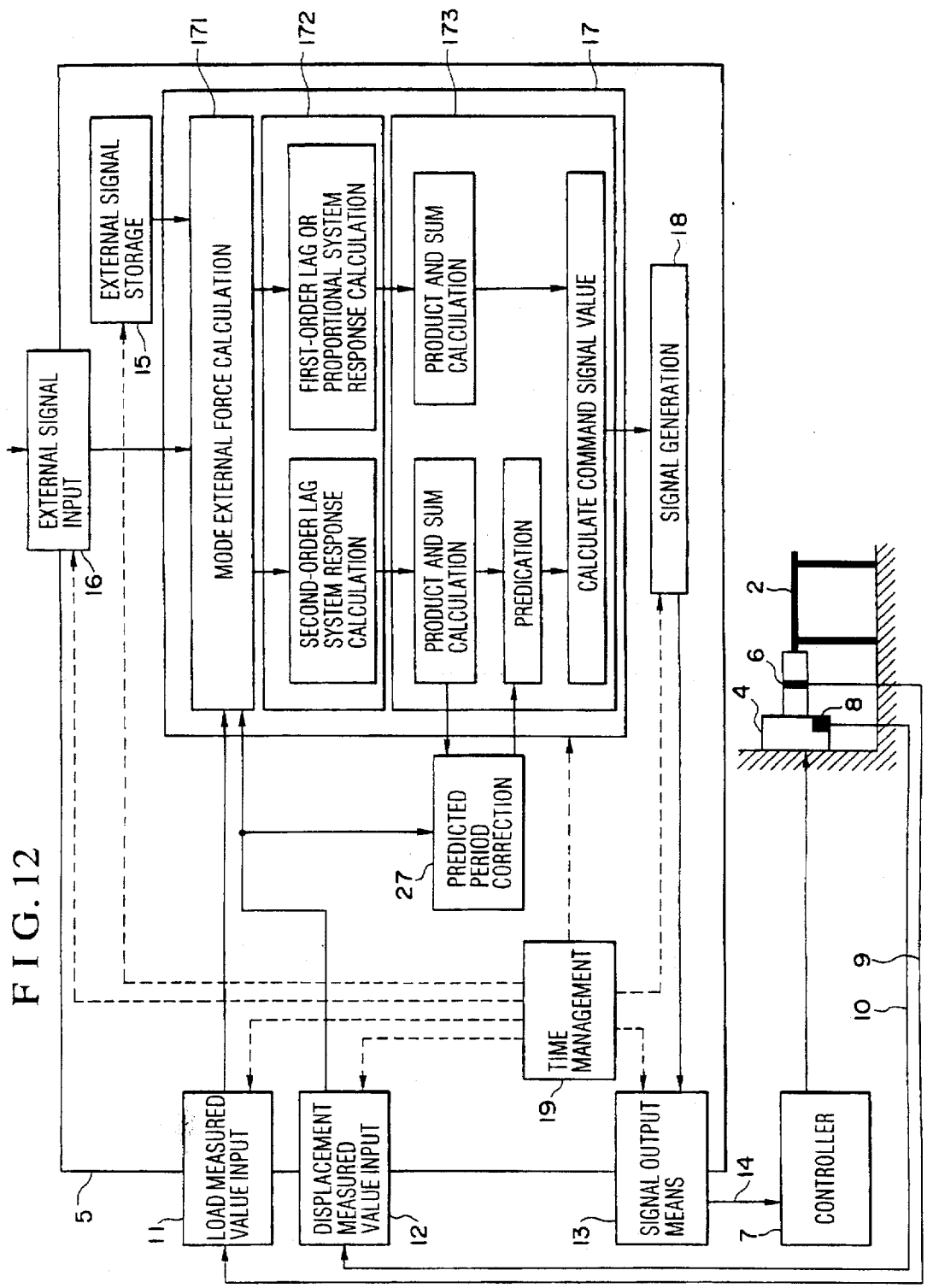
FIG. 12 is a block diagram showing a further embodiment of the shaking test system according to the invention.

A further embodiment will be discussed with reference to FIG. 12. In the shown embodiment, a predicted time correcting means 27 is added for the embodiment of FIG. 6. In the embodiment of FIG. 6, the predicted time of the response value is preliminarily input to the computer. When the set value becomes different from the actual value or differentiated during implementation of the test, it can be a cause of error in the predicted signal and thus of the error of the vibration test.

Therefore, by correcting the predicted time in comparison with the value to be shaked and the actual displacement, precision of experiment can be improved. Correction of the predicted time is implemented as follows, for example. Concerning relative displacement $\Delta x = \Delta x_f + \Delta x_h$ in the calculated partial structure and the measured value $\Delta x'$ of the displacement of the shaking device 4, next integration is performed over one period.

$$I = \oint (\Delta x') d\Delta x \qquad (21)$$

Between this integrated value I and the period T of vibration, amplitude A and the error of the shaking device response delay period (namely, a difference between the actual delay period and the delay period used in prediction) δt', the following relationship can be established.

$$\delta t' = \frac{2IT}{A^2} \qquad (22)$$

By performing this calculation from time to time, the prediction timing is appropriately modified. In the shown embodiment, since the prediction timing is constantly set at the actual value, the precision of prediction, i.e. precision of test, can be improved.

On the other hand, in correction of the prediction period of the shown embodiment, $\Delta x$, can be used in place of $\Delta x$, and a value $\Delta x''$ expressed by the following equation can be used in place of $\Delta x'$.

$$\Delta x'' = \Delta x' - \Delta x_h' \qquad (23)$$

where $\Delta x_h'$ is a value of $\Delta x_h$ before the current timing by δt.

By this, only predicted portions are compared, precision can be further improved.

Figure 13:
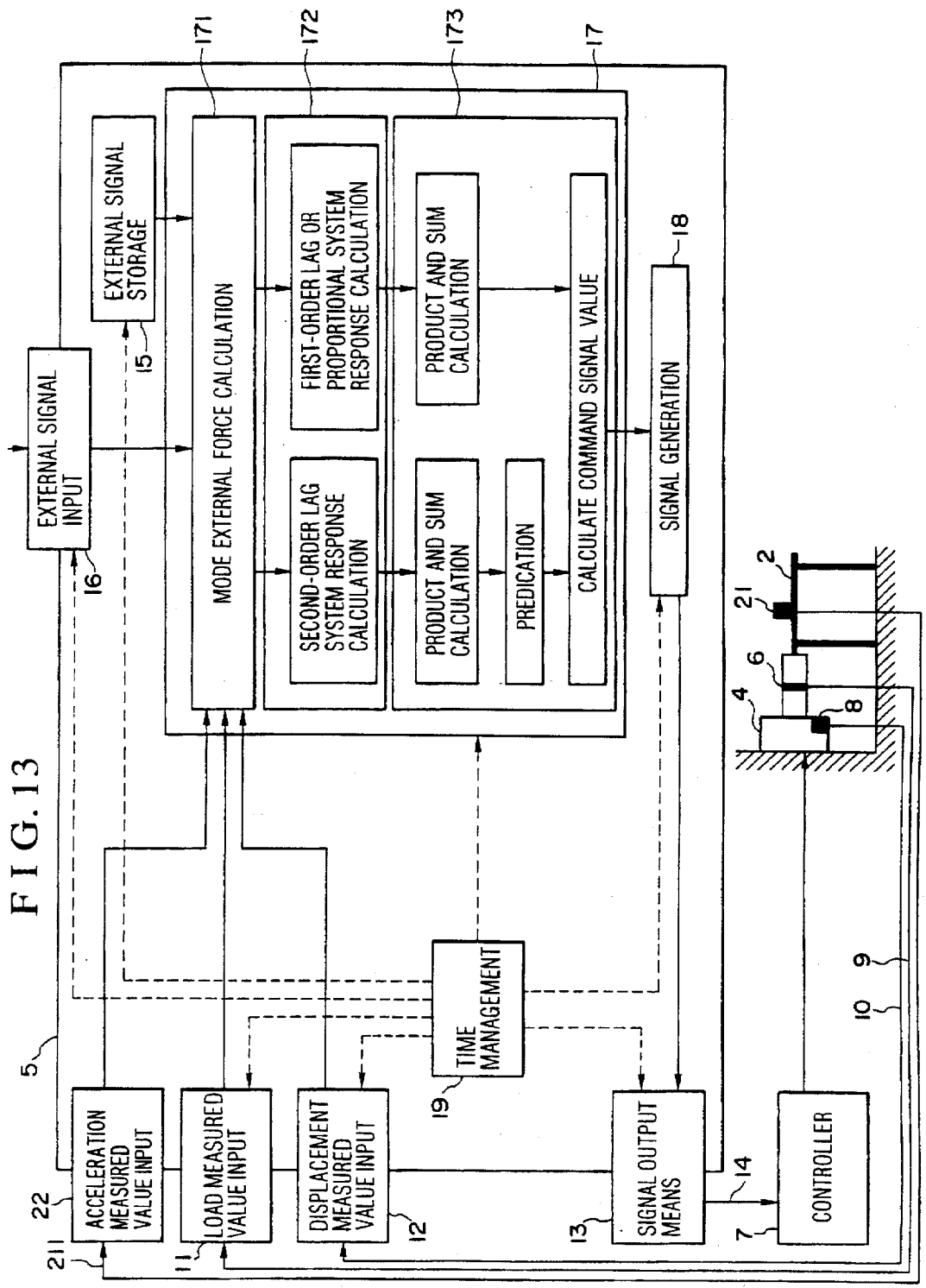
FIG. 13 is a block diagram showing a still further embodiment of the shaking test system according to the invention.

A still further embodiment will be discussed with reference to FIG. 13. In the shown embodiment in addition to the embodiment of FIG. 6, an acceleration measuring means 21 is provided at the shaking point. The measured value is transmitted to the acceleration measured value transmission means 211 and input to the computer 5 by an acceleration measured value input means 22. Also, in place of the load measured value q', a value q" derived from the following equation is employed to implement computing process.

$$q'' = q' - ma$$

wherein m: equivalent mass a: acceleration measured value

It should be noted that the equivalent mass m is a value which can be preliminarily set on the basis of the shape, material and so forth of the partial structure. Therefore, the equivalent mass is input by the user through a data input device (not shown) in advance of initiation of experiment and stored in a data storage device (not shown) in the computer in a form available for use in the foregoing calculation.

The load measured value includes the inertia force due to mass of the partial structure 2. In the shown test, the inertia force is determined by relative acceleration of both ends of the partial structure. However, the inertia force proportional to the absolute acceleration has to be considered in order to evaluate vibration response caused by base excitation, and thus can be a cause of error. Therefore, in the shown embodiment, by removing the inertia force from the load measured value q', only load relating to relative deformation is used as calculation of vibration response. It should be noted that, in the shown embodiment, it becomes necessary to model including the mass of the partial structure as the numerical mode. In the shown embodiment, since the inertia force can be removed, high precision vibration test can be implemented.

Figure 14:
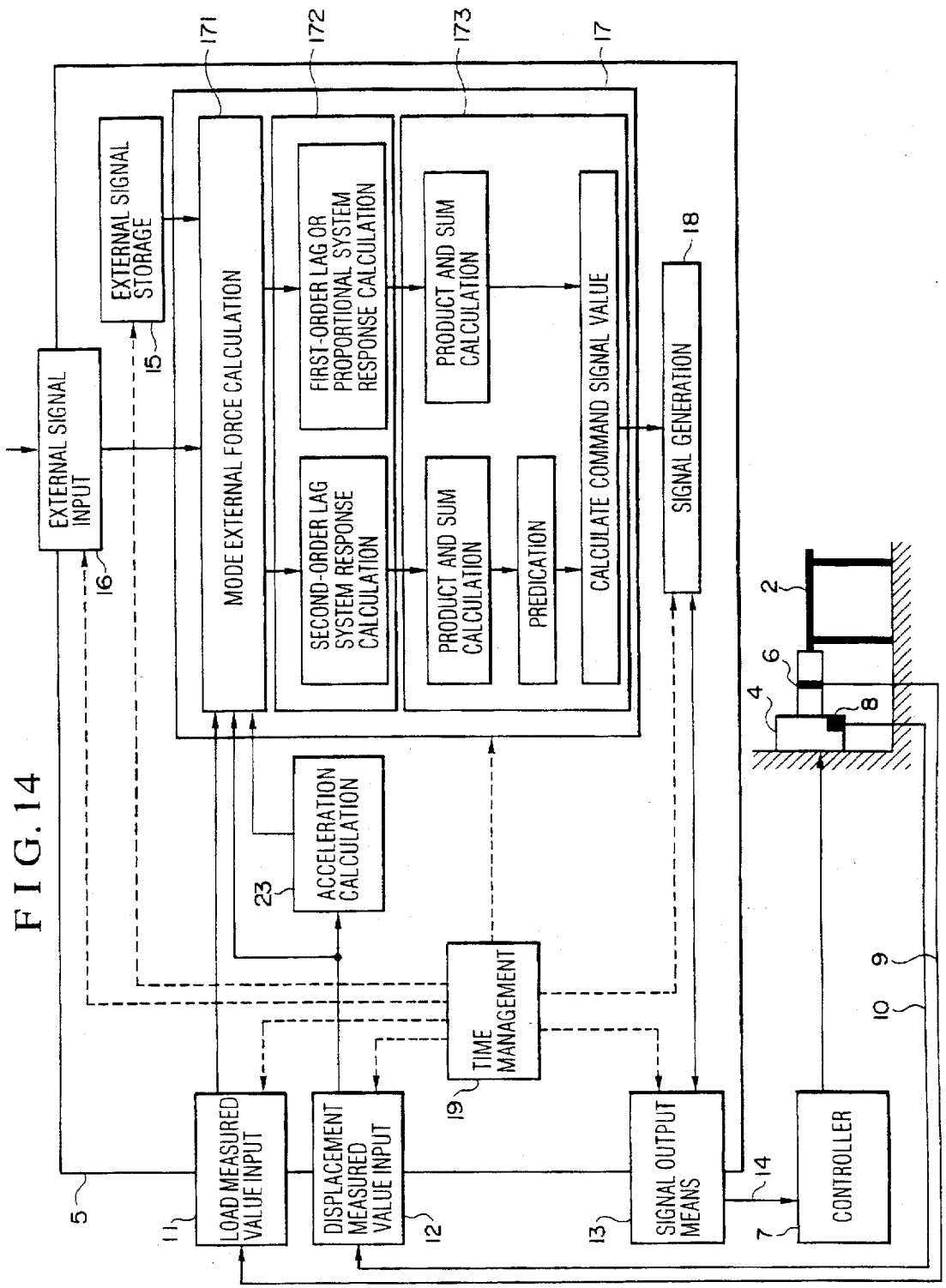
FIG. 14 is a block diagram showing a yet further embodiment of the shaking test system according to the invention.

A yet further embodiment will be discussed with reference to FIG. 14. In the shown embodiment, in place of the acceleration measuring means 21 and the acceleration input means 22 in the embodiment of FIG. 13, an acceleration deriving means 23 is provided. In the acceleration deriving means, a shaking acceleration is derived by differentiating the displacement measured value with respect to time. With employing this value, the equivalent process to the shown embodiment is performed. With the shown embodiment, the same effect to the former embodiment can be obtained. In addition, measuring means and so forth becomes unnecessary.

Figure 15:
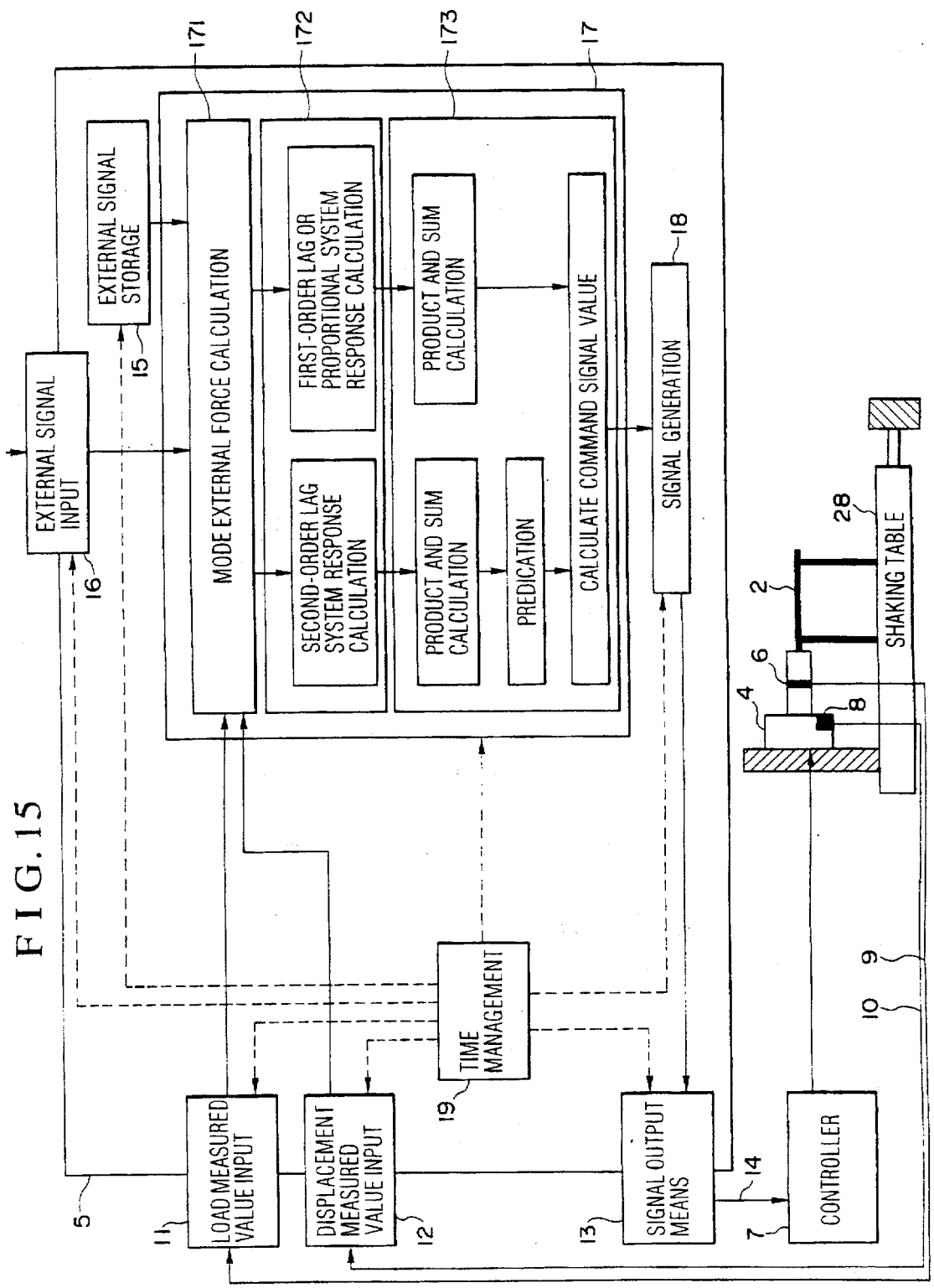
FIG. 15 is a block diagram showing a yet further embodiment of the shaking test system according to the invention.

Further embodiment will be discussed with reference to FIG. 15. In the shown embodiment, the partial structure 2 of the embodiment of FIG. 6 and the shaking device are mounted on a shaking table 28. Upon implementation of the vibration test, the shaking table 28 is driven at an acceleration of the portion where the partial structure is supported. With the shown embodiment, the inertia force corresponding to the absolute acceleration is included in the measured reaction force. Therefore, high precision vibration test becomes possible. It should be noted that, in the shown embodiment, the mass of the partial structure is required to be numerically modeled excluding the mass.

Figure 16:
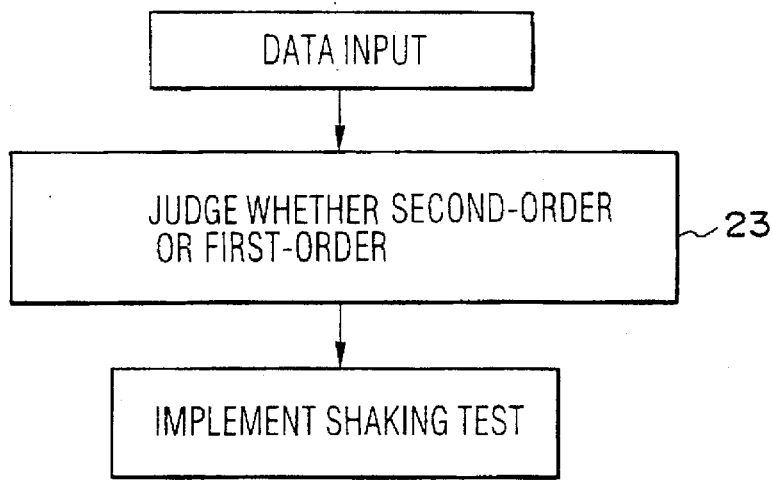
FIG. 16 is a flow diagram showing one embodiment of a shaking test method according to the invention.

A still further embodiment is illustrated in FIG. 16. In addition to the embodiment shown in FIG. 6, means 23 for automatically judging handling of the natural mode between a second-order lag system, a first-order lag system or a proportional system, as a preliminary process in the computer 5. The method of judgement is a discrimination of the natural frequency of each mode relative to the reference value. The reference value is input in advance with judgment on the basis of the time interval of vibration calculation and so forth. In a mode where the natural frequency is higher than the reference value, the process is performed with taking a first-order lag system. On the other hand, in the mode where the natural frequency is lower than the reference value, the process is performed with taking a second-order lag system.

Figure 17:
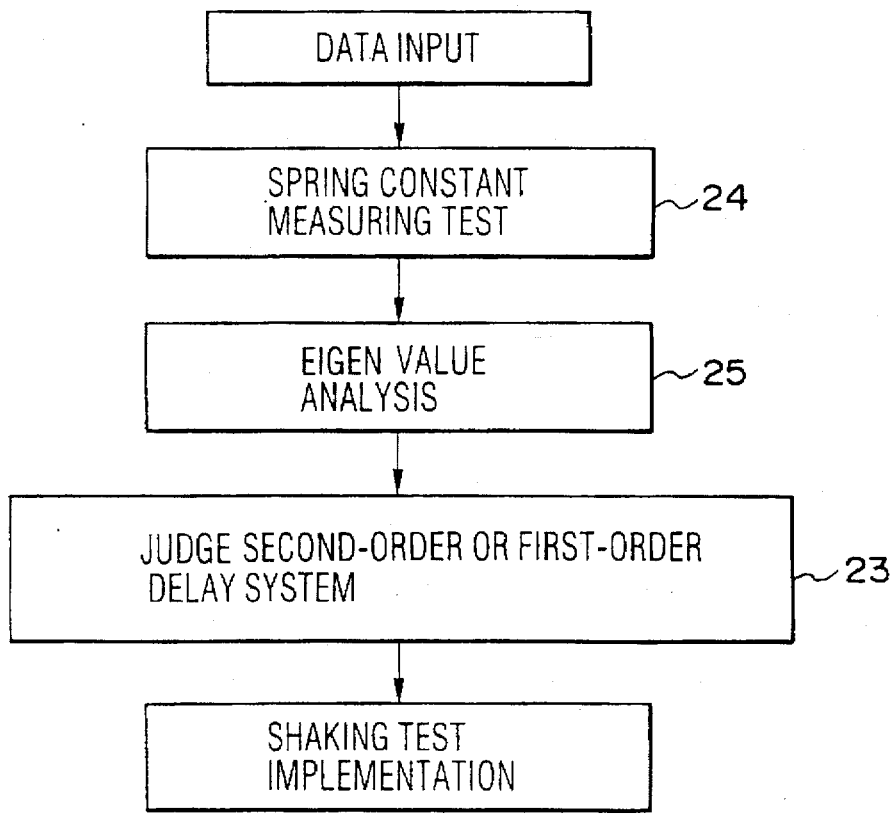
FIG. 17 is a flow diagram showing another embodiment of a shaking test method according to the invention.

A yet further embodiment will be discussed with reference to FIG. 17. In the shown embodiment, in addition to the embodiment of FIG. 16, means 24 for measuring a spring constant of the partial structure by performing shaking test with a small amplitude as a preliminary process, is provided in the computer 5, and means 25 for implementing the eigen value analysis of the structure 1 employing the spring constant derived by the spring constant measuring means 24. With the shown embodiment, the user may easily use the shown testing device. Also, spring constant becomes accurate to make vibration test accurate.

Figure 18:
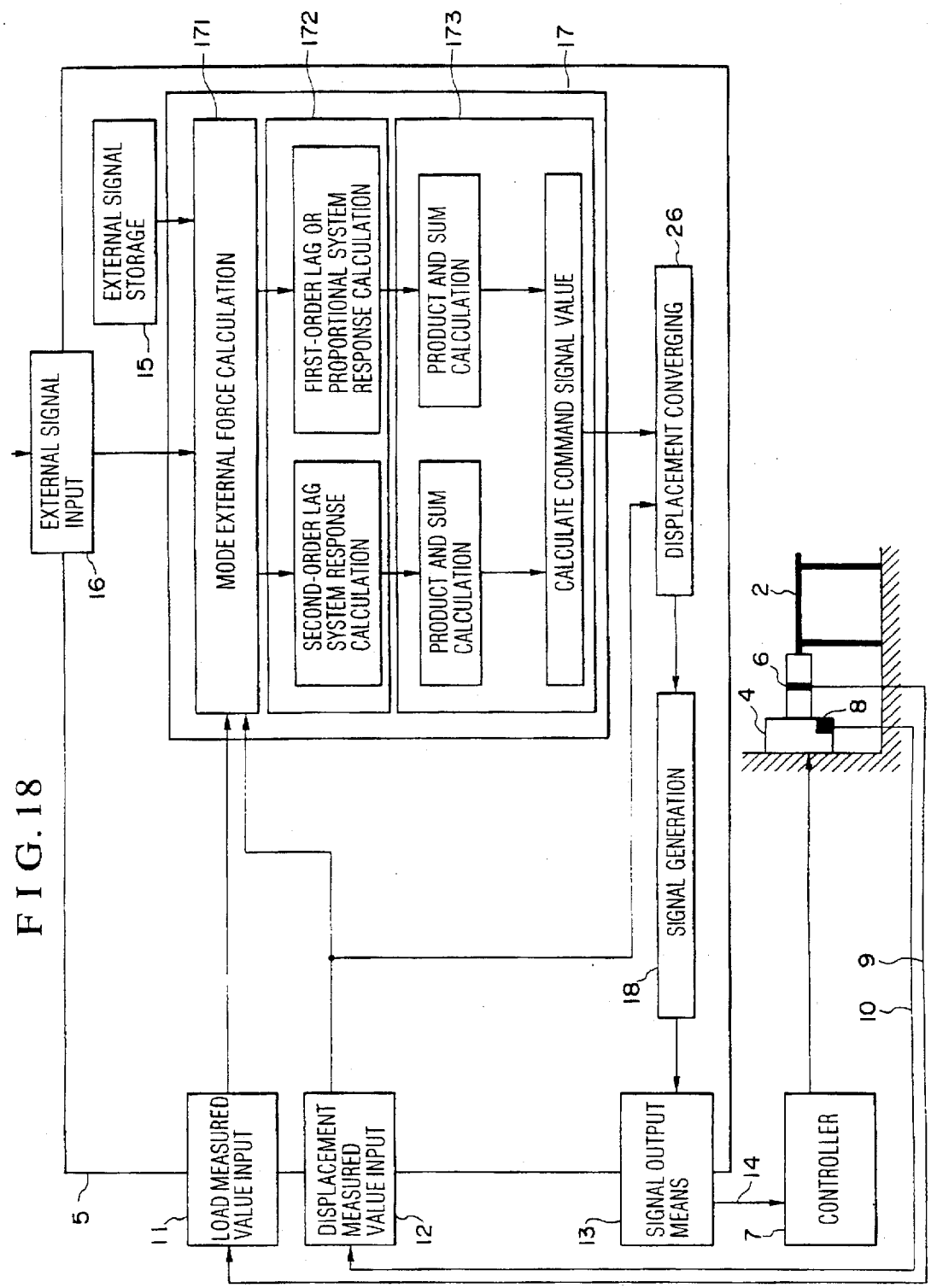
FIG. 18 is a block diagram showing a further embodiment of the shaking test method according to the invention.

A yet further embodiment will be discussed with reference to FIG. 18. In the shown embodiment, displacement convergence judgement means 26 is provided to the embodiment of FIG. 6. Also, without implementing prediction of the response calculated value, and without performing timing management such as the time table of FIG. 7, instead, the displacement convergence judgement means 26 for making judgement whether the predetermined position is matched or not by providing variation in smaller pitch to perform pseudo-dynamic test by slowly driving the shaking device. In the shown embodiment, since the calculation interval can be set longer, number of steps of test can be reduced to shorten the testing period.

It should be noted that, while the foregoing embodiments have been discussed for the case where one objective structure 2 for testing and one shaking device 4 are employed, it may be possible to drive one objective partial structure for testing with a plurality of shaking devices. Also, it is possible to have a plurality of objective partial structures for resting. Furthermore, it is possible to implement vibration test with variety of combinations of the foregoing circuits and means.

On the other hand, while the shown embodiment has been discussed that portion connected to the base as the partial structure to be object for vibration test, the present invention should not be limited to this and the structure can be any portion.

On the other hand, while discussion is given to perform calculation process by one computer, as long as the content can be implemented, it is possible to perform transmission and reception of data between a plurality of computers to perform process in shared manner. The computer is not limited to one CPU. Also, a plurality of CPU may be provided. Furthermore, a parallel computer may also employed. For example, by performing response calculation of one mode response by one CPU, calculation period required for one step can be reduced.

Furthermore, in the foregoing embodiment, input/output device of data, display device and so forth are neglected from the computer, these computer should have peripheral components which are naturally provided for typical computers. Also, it is possible to employ a plurality of computers so that one computer is used for inputting data input and processing of the eigen value analysis, and from one computer, data is transferred to another computer to implement vibration response calculation, to construct a system.

Figure 19:
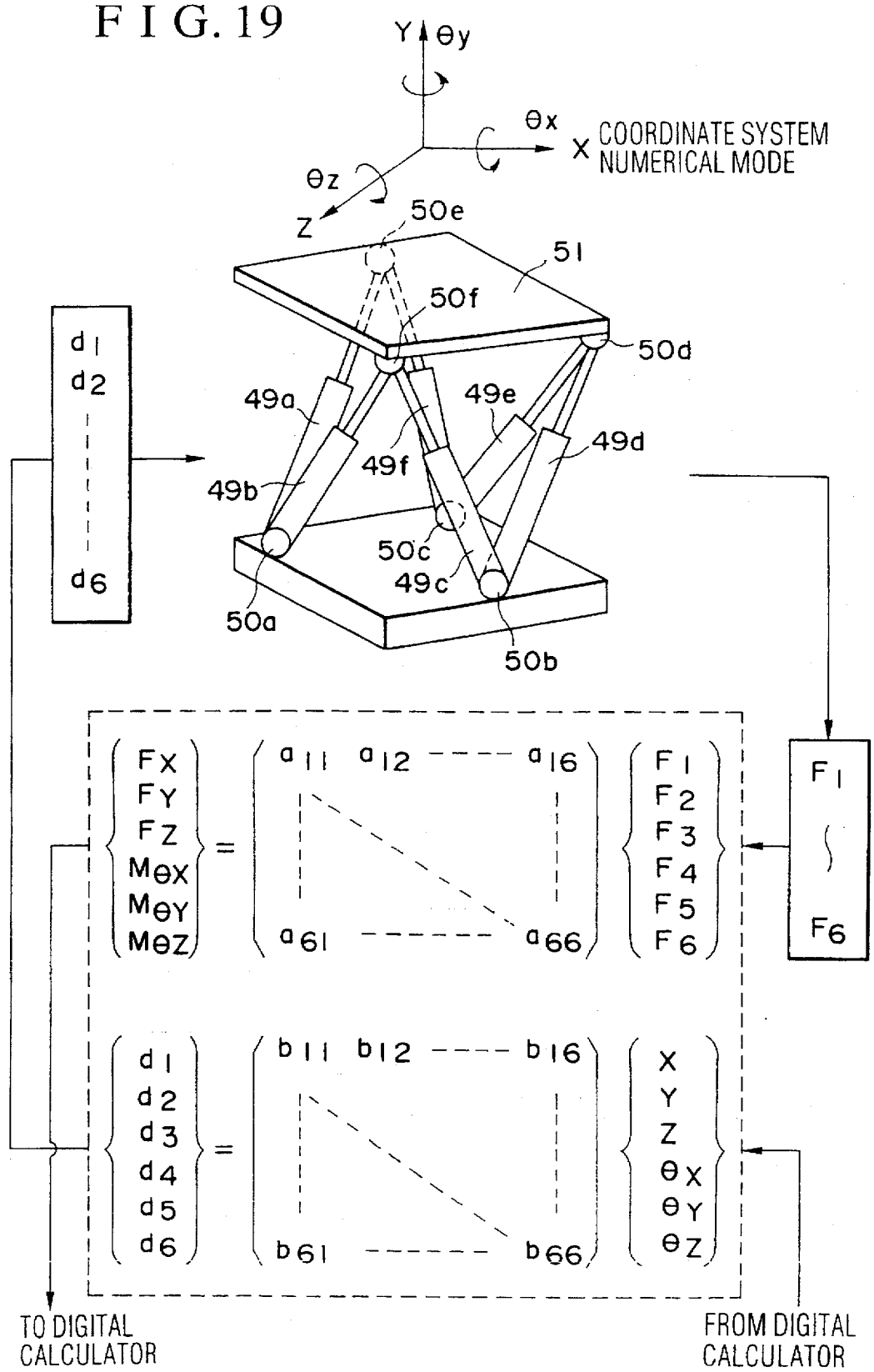
FIG. 19 is a conceptual illustration of a six-degree-of-freedom shaking device.

On the other hand, in the discussion of the embodiment, discussion has been given for a single axis shaking device. It is necessary to take the shaking method corresponding to the degree of freedom of the boundary of numerical model, in practice. For example, it is possible to use a six axes shaking device as shown in FIG. 19, where 49a to 49f are six actuators, 50a to 50f are bearings for mounting respective actuators on a support base or stage 51, the stage 51 is a stage, on which the structure is mounted.

In the foregoing embodiment, discussion has been given for vibration resting portion. According to the present invention, it is possible to calculate vibration response for the point other than shaking point. Therefore, these results of calculation may be stored in the computer or a storage device in the computer for processing after testing. Also, it is possible to output the results of calculation from time to time out of the computer during testing.

A further embodiment of vibration testing method of the present invention will be discussed with reference to FIGS. 20 to 27.

At first, at step 31, a load value and an external force value are inputted. Next, at step 32, displacement of boundary between the actual model and other portion after a predetermined period from load measuring timing is derived. From this displacement, the shaking device command signal is derived at step 33 to input to the shaking device control unit. Thus, shaking of the actual model by the shaking device is performed (step 34), then the load measurement (step 35) and the displacement measurement (step 36) are performed (order of these steps can be reversed or these steps may also be performed simultaneously). Thereafter, completion judgement is appropriately performed (step 37). When not completed, the process is returned to step 31.

Figure 21:
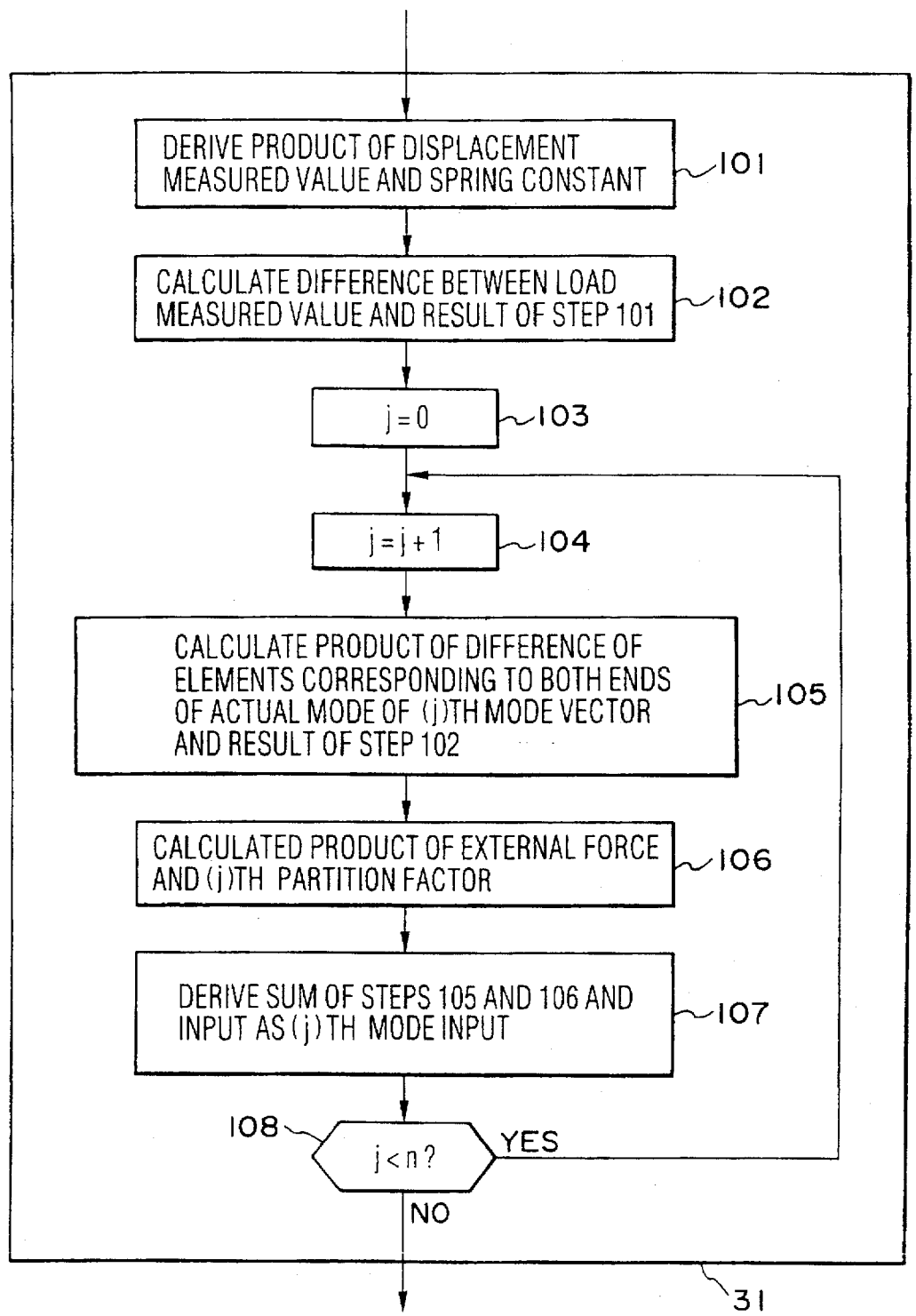
FIG. 21 is a detailed flow diagram of a part of FIG. 20.

Next, content of the step 31 (input calculation step portion) is discussed with reference to FIG. 21. At first, a product of the displacement measured value and the spring constant is calculated (step 101). A difference of the result thereof and the load measured value is calculated (step 102). Let n and j be a number of modes to be used, and a counter, respectively. The counter j is set to be 0 (step 103) and incremented, that is, j=j+1 (step 104). At step 105, a product of a difference of elements corresponding to both ends of the actual model of (j)th mode vector and the result of step 102 is calculated. Next, a product of the external force value and the (j)th mode participation factor is calculated (step 106). Then, a sum of the calculated value of the step 105 and the calculated value of the step 106 are derived to take as input of (j)th mode (step 107). The process of steps 104 to 107 is repeated as long as j<n (step 108). It should be noted that a different judgement to get out of the loop may be applied.

Figure 22:
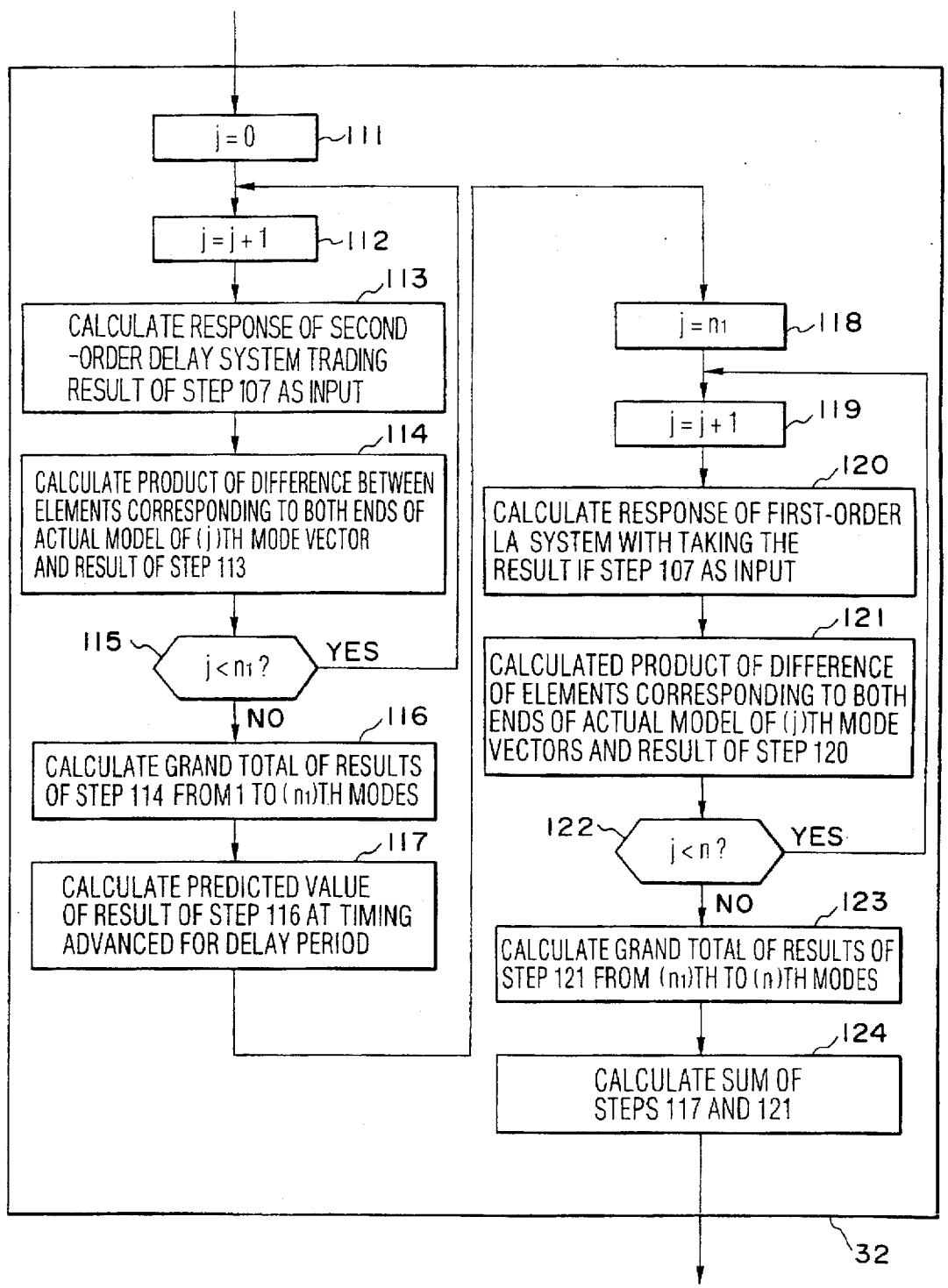
FIG. 22 is a detailed flow diagram of a part of FIG. 20.

The content of step 32 following to the foregoing step 31 will be discussed with reference to FIG. 22. It should be noted that $n_1$ is number of modes treated as a second-order lag system. After setting j=0 (step 111) and incrementing the counter, that is, j=j+1 (step 112), calculation of the second-order lag systems is performed with taking the result of step 107 as input (step 113). A product of the difference of elements corresponding to both ends of the actual model of the (j)th mode vector and the result of step 113 is calculated (step 114). The processes through steps 112 to 114 are repeated as long as j<$n_1$ (step 115). If not j<$n_1$, a grand total of the results of step 114. Then, a predicted value of the result of step 116 at a timing advanced for the delay period is calculated (step 117). After setting j=$n_1$ (step 118) and incrementing the counter, that is, j=j+1 (step 119), a response of the first-order lag system is derived with taking the result of step 107 as input (step 120). Subsequently, at step 121, a product of the difference between elements corresponding to both ends of the actual model of the (j)th mode vector and the result of the step 120 is calculated. The processes of the steps 119 to 121 are repeated as long as j<n is maintained (step 122). If j<n is not established, a grand total of the result of the step 121 for from ($n_1$)th to (n)th modes is calculated (step 123). Subsequently, the sum of the result of step 117 and the result of step 121 is calculated (step 124).

Figure 23:
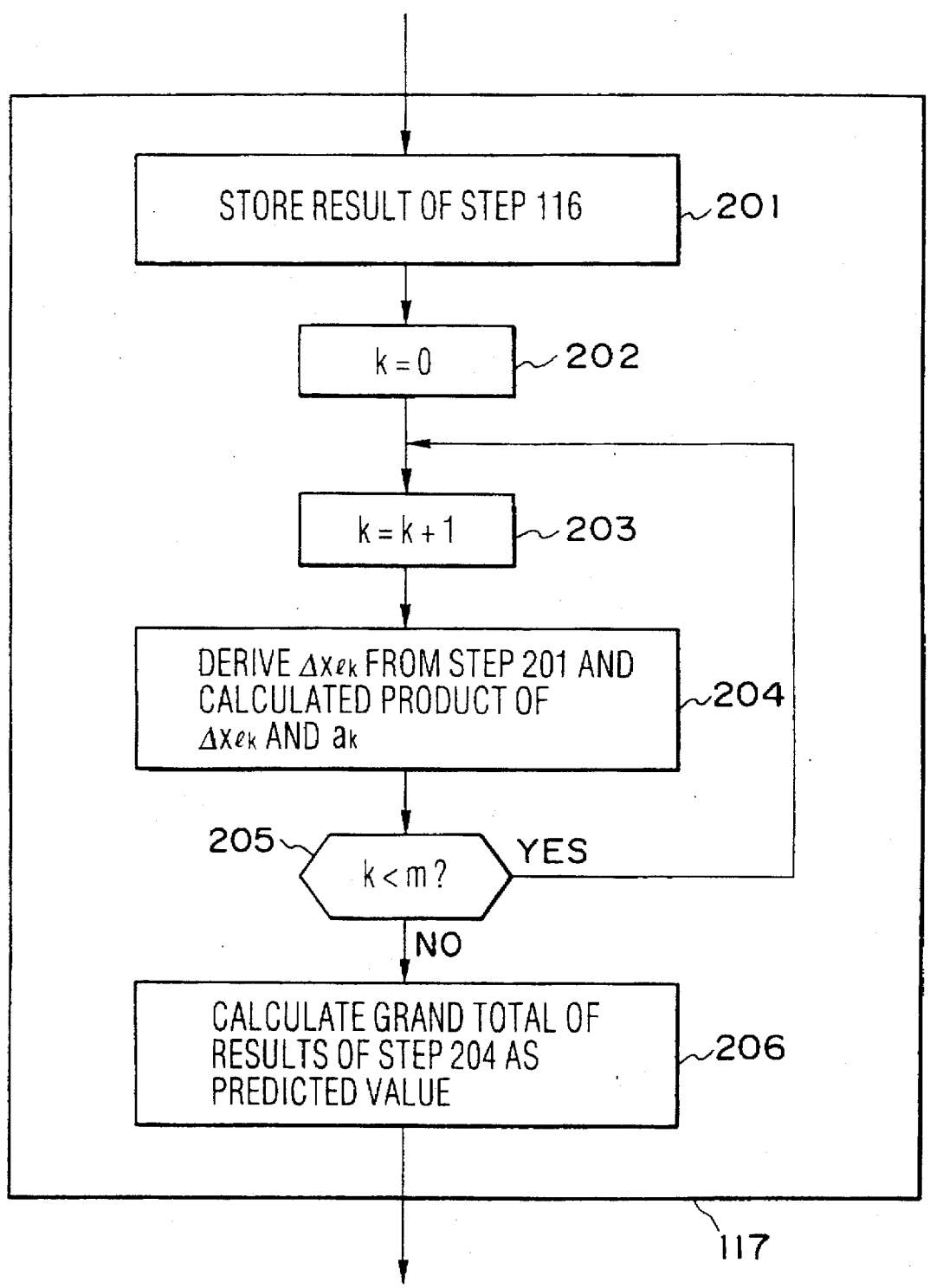
FIG. 23 is a detailed flow diagram of a part of FIG. 22.

With respect to step 117 in the step 32, one example is shown in FIGS. 23 and 11. Let m be number of points to be used for prediction (see equation (20)), $a_k$ be a pre-set coefficient (see table 1), and k be a counter. At first, the result of step 116 is stored (step 201). Then, the counter k is set to 0 (step 202) and incremented, that is, k=k+1 (step 203). Thereafter, at step 204, $\Delta x_{ik}$, is derived from step 201. Then, a product of $\Delta x_{ik}$ and $a_k$ is calculated. The steps 203 and 204 is repeated as long as k<m (step 205). If not k<m, the grand total of the results of step 204 is calculated (step 206). Thus, in the signal value calculating step, the prediction of the sum of the response calculated value of the second-order lag systems, after a given period is implemented by multiplying the sum of the past response calculated values derived in predetermined number of past calculation cycles performed with a given time intervals, and the sum of the response calculated value of the current step with respectively predetermined coefficients, and by adding the products.

Figure 24:
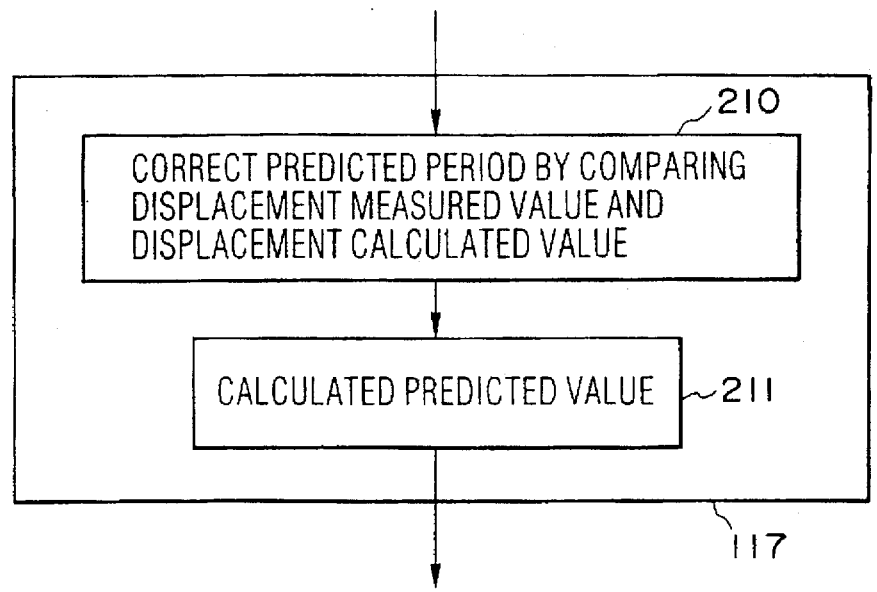
FIG. 24 is a detailed flow diagram of a part of FIG. 22.

In FIG. 24, replacement for the example of FIG. 23 with respect to the content of the step 117 is illustrated. Namely, at step 210, correction is performed for the predicted period on the basis of comparison of the displacement measured value and the displacement calculated value. Next, the predicted value is calculated (step 211). Namely, in this example, the displacement caused in the actual model by the shaking device is measured by the shaking displacement measuring means of the shaking device, and the measured value is input to the computer. In the computer, the displacement measured value and the calculated value at the shaking device command signal calculating step are compared to correct the set value of the shaking device response delay period to be used in prediction by the shaking signal calculating means.

Figure 25:
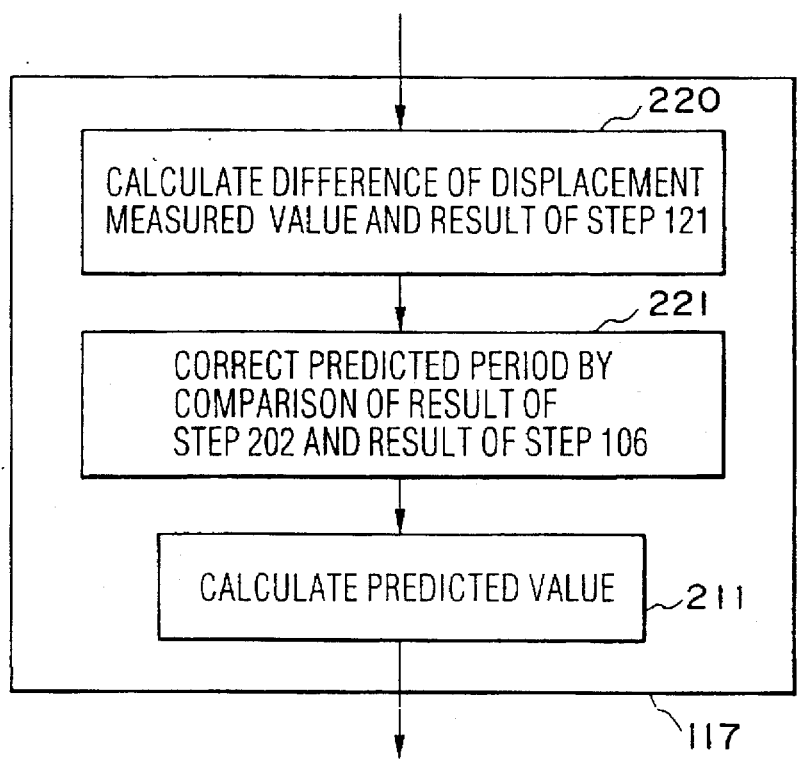
FIG. 25 is a detailed flow diagram of a part of FIG. 22.

FIG. 25 shows another replacement of the embodiment of FIG. 23 for step 117. Namely difference between the displacement measured value and the result of step 121 is calculated (step 220). Based on comparison of the result at step 202 and result at step 116, the predicted period is corrected (step 221). Then, calculation of the predicted value is performed (step 211). Namely, in this example, correction of the shaking device response delay period is performed by deriving the correction value by comparing the calculated value calculated by multiplying the response calculated value of respective systems in the second-order lag system with a difference of elements corresponding to both ends of the actual model in the mode vectors of respective modes, and a difference between the displacement measured value, and the sum of the value derived by multiplying the displacement measured value and the difference of elements corresponding to both end of the actual model among mode vectors in respective modes in the first-order lag system or proportional system at a timing before the current timing in the magnitude corresponding to the shaking device response delay period set value used in prediction.

Figure 26:
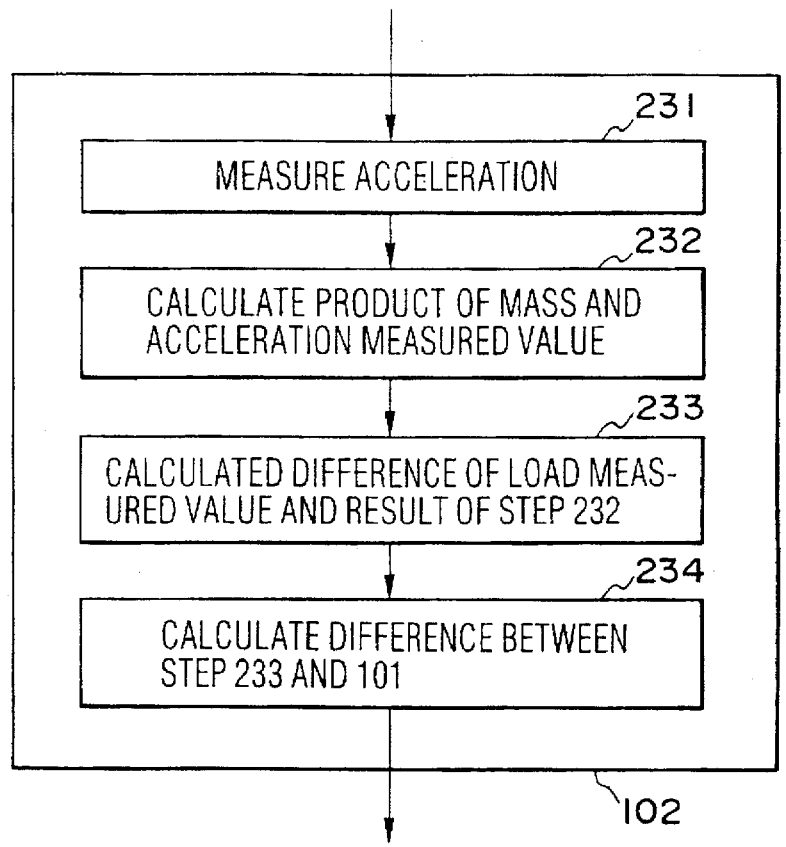
FIG. 26 is a detailed flow diagram of a part of FIG. 21.

One example (or replacement) of content of step 102 in step 31 will be discussed with reference to FIG. 26. Namely, at step 231, shaking acceleration is measured or calculated. Then, at step 232, the product of the coefficient preliminarily determined as equivalent mass of the actual model and the acceleration measured or calculated value is derived. At step 233, a difference between the actual load measured value and the result of step 232 is calculated. The result of step 233 is employed as the load measured value to derive a difference to the result of step 101.

Figure 20:
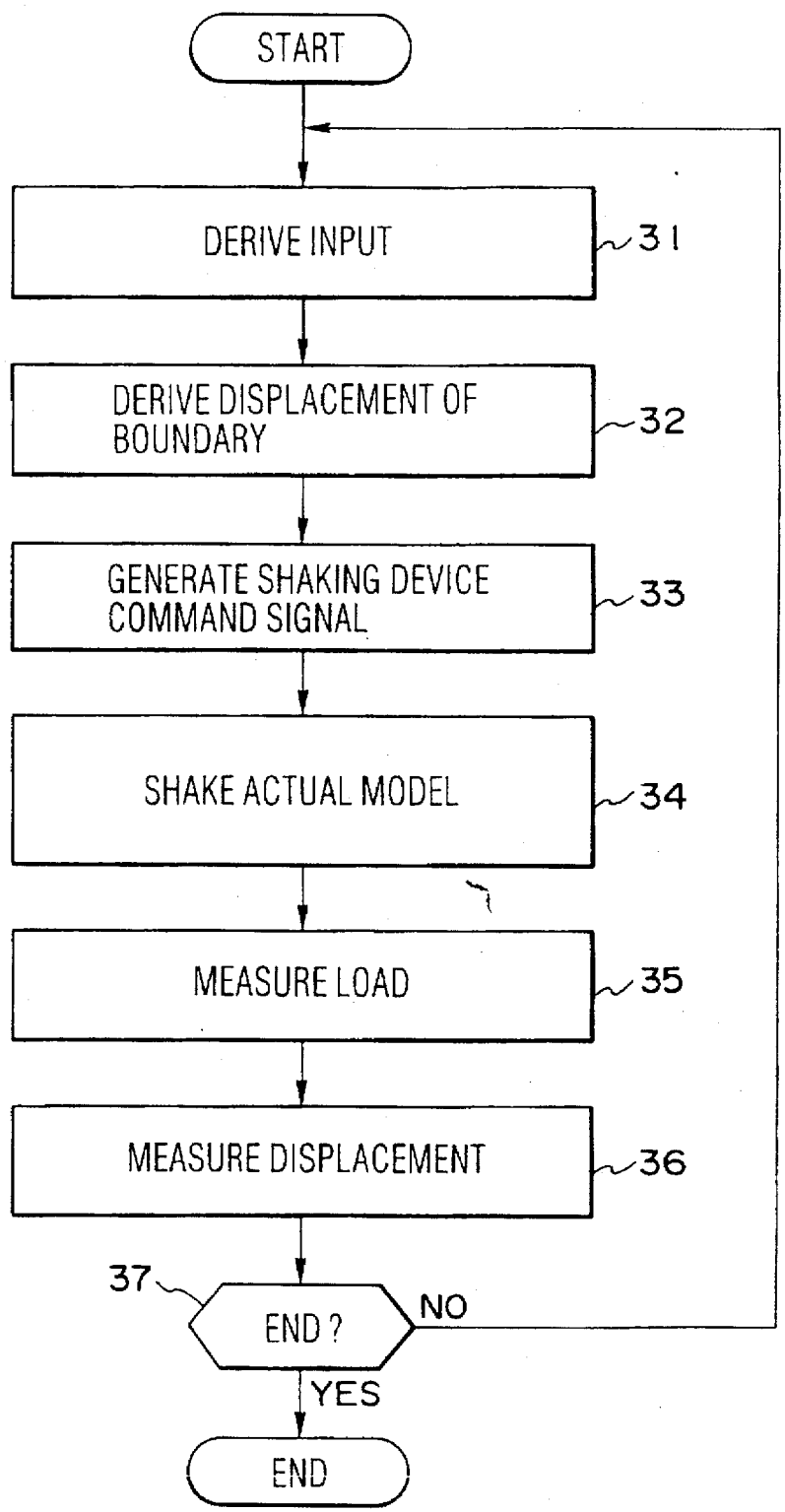
FIG. 20 is a flow diagram showing a further embodiment of a shaking test method according to the invention.
Figure 27:
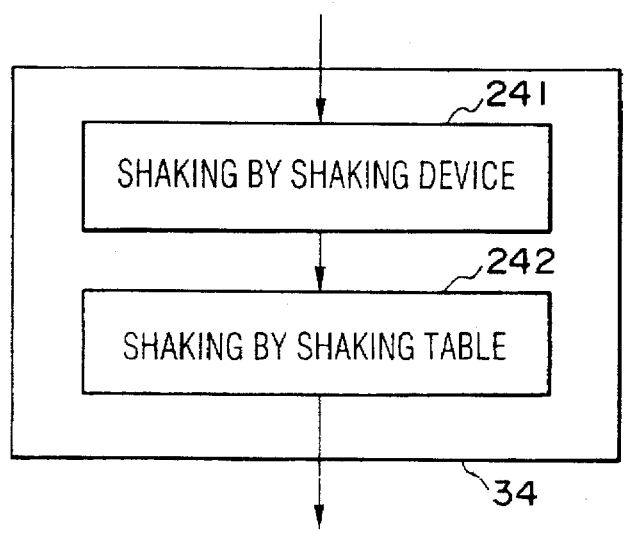
FIG. 27 is a detailed flow diagram of a part of FIG. 20.

FIG. 27 shows one example of step 34 (see FIG. 20). Namely, the shaking device and the objective structure for testing are mounted on the shaking table. Simultaneously with shaking by the shaking device (step 241), the structure is shaken by the acceleration applied thereto, and further shaken by the shaking table (step 242).

Figure 28:
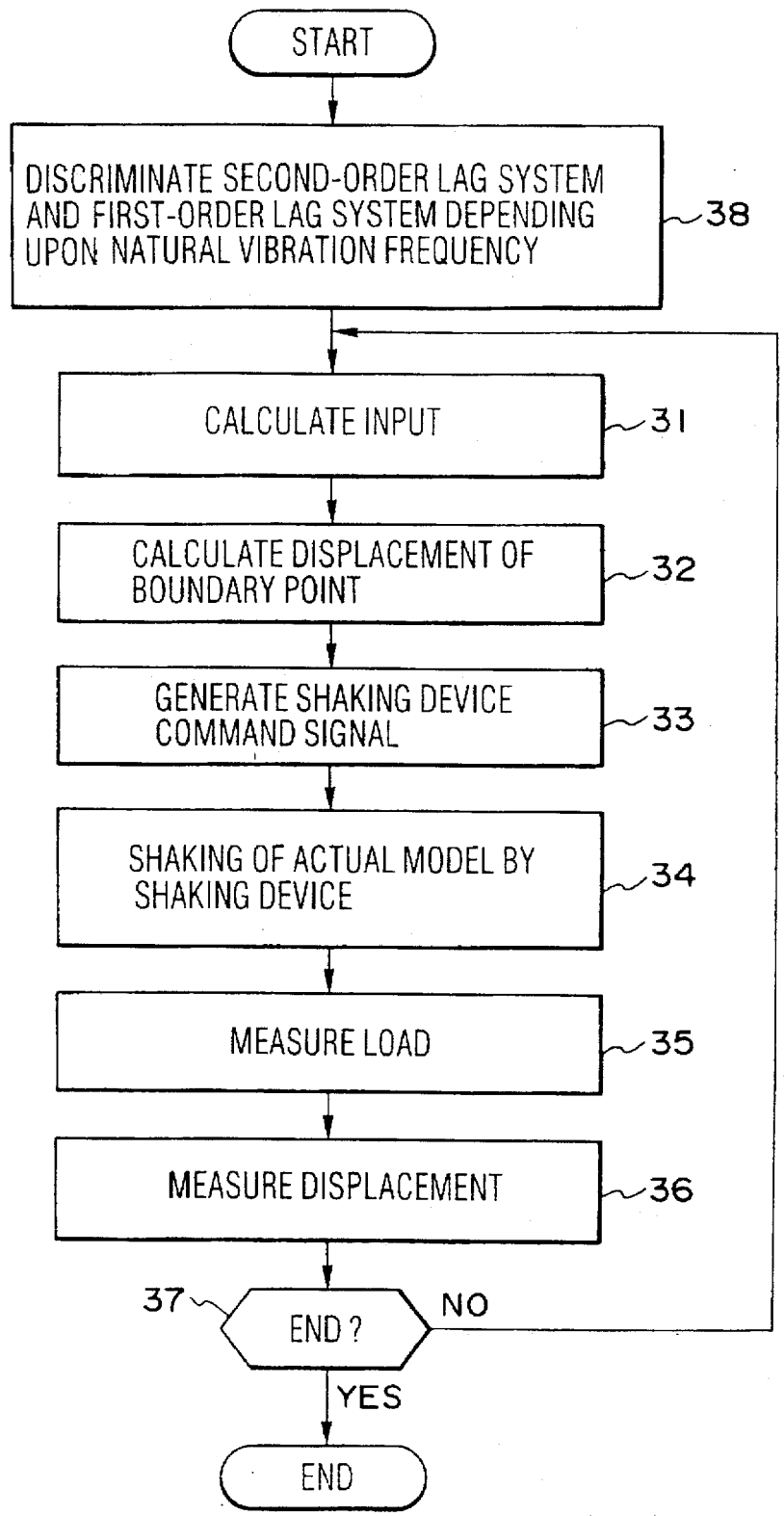
FIG. 28 is a block diagram showing a still further embodiment of the shaking test method according to the invention.

Next, discussion will be given for a still further embodiment of the vibration testing method according to the present invention with reference to FIG. 28.

The difference of the shown embodiment and the embodiment shown in FIG. 20 is that, when the natural frequency of the input second-order lag system is higher than the predetermined value, the first-order lag system, in which the second-order differential term is neglected is employed as a replacement of the second-order lag system by step 38. Namely, step 38 is a step for discriminating the second-order lag system and the first-order lag system depending upon the natural frequency.

Figure 29:
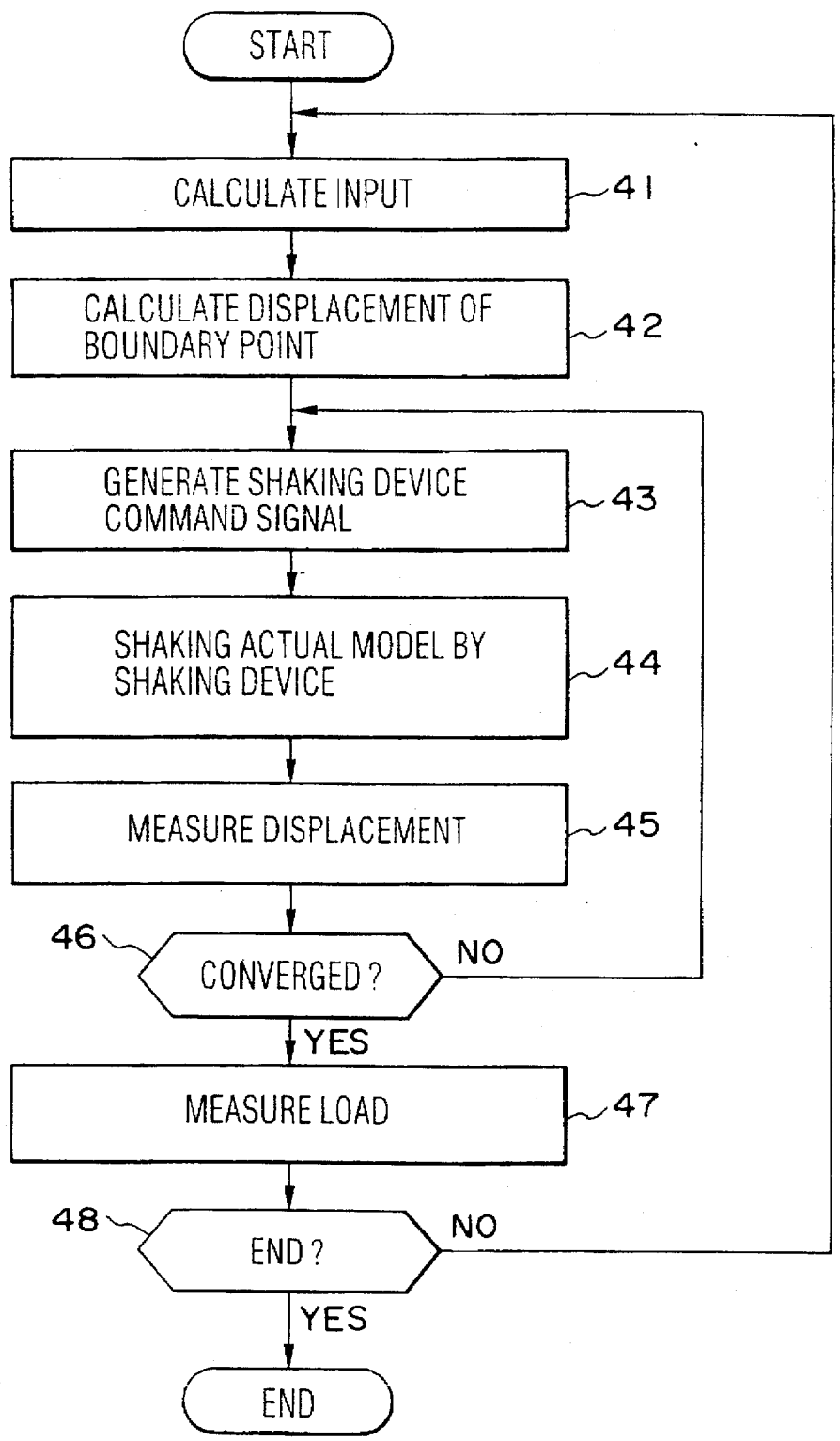
FIG. 29 is a block diagram showing a yet further embodiment of the shaking test method according to the invention.

A yet further embodiment will be discussed with reference to FIGS. 29 and 30. At first, similarly to the embodiment of the embodiment of FIG. 20, calculation of input is performed (step 29). Then, the displacement of the boundary point is calculated (step 42). Thereafter, the shaking command signal is generated (step 43) to perform shaking of the actual model by the shaking device (step 44). Different from the example of FIG. 20, at the next step, measurement of displacement is performed (step 45) to make judgement whether converging or not (step 46). If not converging, the process is returned to step 43. On the other hand, converging is judged, measurement of load is performed (step 47). Thereafter, completion judgement is performed (step 48). If not completed, the process is returned to the input calculation step (step 41).

Figure 30:
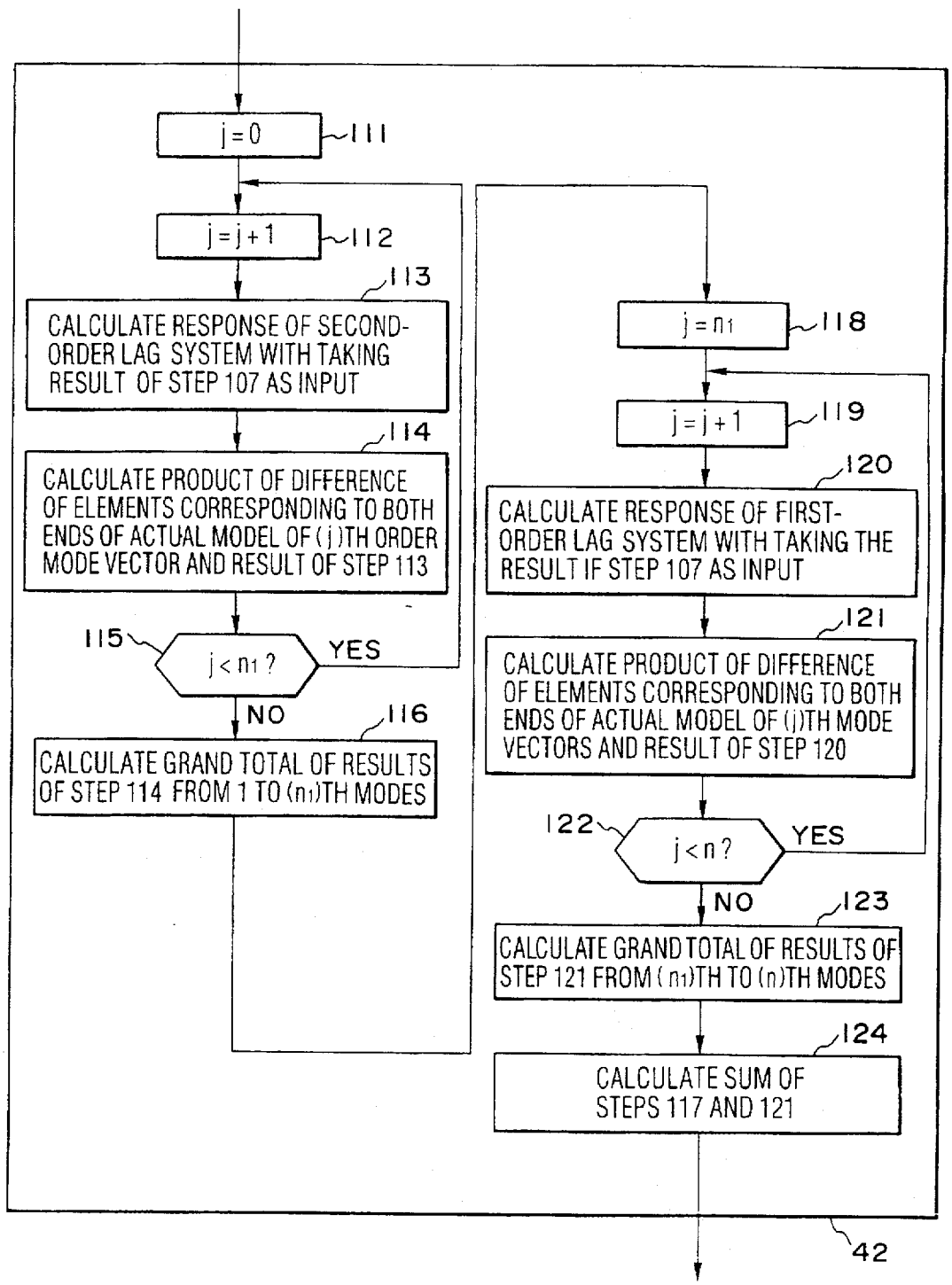
FIG. 30 is a detailed flow diagram of a part of FIG. 29.

FIG. 30 is a detailed illustration of step 42 (calculation of displacement of the boundary). At first, the counter j is set to be 0 (step 111) and incremented, that is, j=j+1 (step 112). Thereafter, the second-order lag system response is calculated with taking the result of step 107 as input (step 113). At step 114, the product of the difference of the elements corresponding to both ends of the actual model of (j)th mode vector and the result of step 113 is calculated (step 114). These steps 112 to 114 is repeated as long as j<$n_1$ is maintained (step 115). If not j<$n_1$, the ground total of the results of step 114 of 1 to $n_1$th modes is calculated (step 116). Next, the counter j is set to be $n_1$ (step 118) and incremented, that is, j=j+1 (step 119). Thereafter, the response of the first-order lag system is derived with taking the result of step 107 as input (step 120). At step 121, a product of the difference between elements corresponding to both end of the actual model of (j)th mode vector and the result of the step 120 is calculated. The processes of the steps 119 to 121 are repeated as long as j<n is maintained (step 122). If not j<n, the ground total of the results of step 121 (step 123).

Finally, the sum of the result of step 117 and the result of step 121 is calculated (step 124).

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A shaking test system for testing a structure comprising:
    a shaking device for shaking the structure;
    measuring means mounted on said shaking device;
    external force signal input means for inputting data indicative of an external force for shaking said structure;
    modal external force calculating means for providing a modal external force with respect to a vibration mode on a basis of external force data input from said external force signal input means and an external force input from said measuring means and representative of the external force induced by said structure;
    first vibration response calculating means for calculating vibration response with respect to each mode relating to first-order lag system of a differential equation to an output of said modal external force calculating means;
    second vibration response calculating means for calculating vibration response with respect to each mode in a second-order lag system of the differential equation to the output of said modal external force calculating means;
    shaking commanding means for generating a shaking command signal on a basis of outputs of said first and second vibration response calculating means; and
    a controller connected to said shaking commanding means for controlling shaking for said shaking device on a basis of said shaking commanding means.

2. A shaking test system as set forth in claim 1, which further comprises vibration response predicting means connected between said second vibration response calculating means and said shaking commanding means for providing a vibration response predicted value of a small period later relating to vibration response provided from said second vibration response calculating means.

3. A shaking test system as set forth in claim 2, which further comprises predicted period correcting means connected to said vibration response predicting means for correcting a predicted period so that achieving shaking response matching with a prediction on the basis of the external force induced by said structure input from said measuring means.

4. A shaking test system as set forth in claim 1, which further comprises timing managing means connected to said measuring means, said external force signal input means, said modal external force calculating means, said first vibration response calculating means, said second vibration response calculating means, said shaking commanding means and said controller for regularly providing operation timings for respective means.

5. A shaking test method for a structure comprising the steps of:
    establishing a numerical model of an object structure for evaluation and
    establishing an actual model with a part of said object structure;
    calculating a natural frequency and natural mode vector in each vibration mode by eigen value analysis using data of said numerical model and said actual model;
    maintaining one mode as a second-order lag system and converting at least one mode among remaining modes into a first-order lag system or proportional system;
    shaking said actual model with a shaking device connected thereto;
    measuring load and displacement applied to said actual model by said shaking device by means of measuring equipment;
    inputting a load value and external force value associated with shaking by said shaking device;
    calculating displacement at a boundary between said actual model and another portion of said object structure at a given period later from a measurement timing of said load by said measuring equipment with employing said second-order lag system and said first-order lag system or proportional system converted from second-order lag system; and
    generating a command signal for input to a controller for controlling said shaking device.

6. A shaking test method for a structure as set forth in claim 5, wherein said step of calculating displacement includes steps of deriving a difference between a measured said load value and a product of a spring constant of the numerical model of the actual model portion and a measured said displacement value, multiplying the difference with a difference between elements corresponding to both ends of said actual model among mode vectors in each modes, and adding a product of the external force value and preliminarily derived participation factor of said external force for each mode, to said multiplied product to derive input for each mode.

7. A shaking test method for a structure as set forth in claim 6, wherein said calculating step includes a response calculating step which calculates a response calculated value of a given period later with respect to the input calculated with respect to each mode in said input calculation step.

8. A shaking test method for a structure as set forth in claim 7, wherein, among response calculated value of each mode of said response calculating step, deriving a sum of products of the response calculated value of each mode derived as second-order lag system and the difference between elements corresponding to both end of said actual model among mode vectors of each mode, predicting a value of later period advanced corresponding to a predetermined shaking device response delay period with respect to said sum, deriving a sum of products of the response calculated value of each mode derived as first-order lag system or proportional system and the difference between elements corresponding to both end of said actual model among mode vectors of each mode, and deriving a sum of said last mentioned sum and said predicted value as a command signal value for said shaking device at the given period later.

9. A shaking test method for a structure as set forth in claim 8, wherein the set value of the shaking device response delay period to be used for prediction upon calculation of said shaking signal is corrected by measuring shaking displacement applied to said actual model from said shaking device, inputting the measured value to a computer, and comparing the displacement measured value and calculated value derived at the shaking device command signal calculating step.

10. A shaking test method for a structure as set forth in claim 9, wherein correction of said shaking device response delay period is derived by comparing the sum of the product of the response calculated value of respective mode of the second-order lag system and the difference of elements corresponding to both ends of said actual model in mode vectors of each mode as the calculated value, and the product of said displacement measured value and the difference of elements corresponding to both ends of said actual model in mode vectors of each mode of the first-order lag system or the proportional system ahead of the shaking device response delay period setting value used in prediction.

11. A shaking test method for a structure as set forth in claim 8, wherein shaking acceleration is measured or calculated, and a difference between the actual load measured value and the product of a predetermined coefficient established as the equivalent mass of said actual model and said acceleration measured or calculated value, is used as said load measured value.

12. A shaking test method for a structure as set forth in claim 8, which further comprises a step of mounting the shaking device and the objective structure for testing on a shaking table, and in conjunction with shaking by means of said shaking device, shaking is caused by an acceleration exerted on said structure.

13. A shaking test method for a structure as set forth in claim 8, which further comprises a step of converting said second order lag system into the first-order lag system by neglecting a second-order differential term when the natural frequency of the input second-order lag system is higher than a value preliminarily determined before implementation of shaking test.

14. A shaking test method for a structure as set forth in claim 8, which further comprises steps of measuring a spring constant of the objective structure for shaking by shaking said shaking device in a small magnitude, implementing eigen value analysis employing said spring constant and preliminarily input numerical value, for setting as said second-order lag system for modes having lower natural vibration frequency than a value preliminarily determined among the resultant value of analysis, and setting as the first-order lag system for modes having higher natural vibration frequency than a value preliminarily determined among the resultant value of analysis.

15. A shaking test method for a structure as set forth in claim 7, wherein prediction of the sum of the response calculated value of the second-order lag system at given period later is performed by adding a sum of the given number of past response calculated values calculated at a given time interval, and a product of the sum of the response calculated values of the current step and a predetermined coefficient.

16. A shaking test system for a structure comprising:

a shaking device connected to an objective structure for shaking said structure;

measuring means for measuring load and displacement exerted to said structure from said shaking device;

a digital computer including:

time managing means for managing timing;

external signal input means for inputting data indicative of external force for shaking said structure;

response calculating means for calculating a vibration response of a second-order lag system and a first-order lag system converted from second-order lag system for a predetermined period later than a measuring timing of the load and displacement on a basis of the measured values of said load and said displacement, and said external force signal; and signal value calculating means for calculating a command signal value for said shaking device to be said predetermined period later from the measuring timing of said load and displacement depending upon the output of said response calculating means.

17. A shaking test system for a structure as set forth in claim 16, wherein said signal value calculating means derives a sum of products calculated by multiplying said response calculating means of each system of the second-order lag system among the response calculated value of respective system of said response calculating means, predicts a value of the sum of a predetermined period later, and derives a sum of products calculated by multiplying said response calculating means of each system of the first-order lag system or a proportional system among the response calculated value of respective system of said response calculating means.

18. A shaking test system for a structure as set forth in claim 17, wherein said computer includes a storage means for storing past response calculated values, and the prediction of the sum of the response calculated values of the second-order lag system is performed by multiplying a sum of a given number of stored past response calculated values calculated at said given time interval and a sum of the response calculated value of the current step by a predetermined coefficient and by adding the products.

19. A shaking test system for a structure as set forth in claim 17, wherein said computer includes a predicted period correcting means, said predicted period correcting means compares the displacement measured value and the calculated value in said shaking device command signal calculating means for correcting the timing to be used for prediction in said shaking signal calculating means.

20. A shaking test system for a structure as set forth in claim 16, wherein said computer has a function for converting into the first-order lag system by neglecting a second-order differential term when the natural frequency of the input second-order lag system is higher than a value preliminarily determined before implementation of shaking test.

21. A shaking test method for a structure as set forth in claim 16, wherein said computer has a storage means for storing a criterion for setting modes as a first and second order lag system and has a function for measuring a spring constant of the objective structure for shaking by shaking said shaking device in a small magnitude, implementing eigen value analysis employing said spring constant and said criterion, for setting modes having lower natural frequency than a value preliminarily determined among the resultant value of analysis as said second-order lag system, and setting modes having higher natural frequency than a value preliminarily determined among the resultant value of analysis as the first-order lag system.

* * * * *